(12) United States Patent
Paturi et al.

(10) Patent No.: US 7,359,772 B2
(45) Date of Patent: Apr. 15, 2008

(54) METHOD, SYSTEM, AND STORAGE MEDIUM FOR COMMUNICATING WITH VEHICLE CONTROL

(75) Inventors: Ramesh Paturi, Hyderabad (IN); Rangababu Naga Venkata Thota, Sccuncrabad (IN); Ravi Bhushan Konduru, Hyderabad (IN); David Wilbon, Buchannan, VA (US); Robert A. Seymour, Roanoke, VA (US); Brian N. Meyer, Salem, VA (US); John S. Harrison, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 677 days.

(21) Appl. No.: 10/702,285

(22) Filed: Nov. 6, 2003

(65) Prior Publication Data

US 2005/0102584 A1    May 12, 2005

(51) Int. Cl.
*G06F 17/00*    (2006.01)
(52) U.S. Cl. .................. 701/29; 701/35; 701/36; 714/47; 702/188
(58) Field of Classification Search ................ 701/36, 701/29; 714/47; 702/188
See application file for complete search history.

(56) References Cited

U.S. PATENT DOCUMENTS

| | | | |
|---|---|---|---|
| 5,541,840 A * | 7/1996 | Gurne et al. .................. 701/33 |
| 5,757,645 A | 5/1998 | Schneider et al. .... 364/424.034 |
| 5,787,367 A * | 7/1998 | Berra ........................... 701/29 |
| 6,169,943 B1 * | 1/2001 | Simon et al. .................. 701/29 |
| 6,236,917 B1 * | 5/2001 | Liebl et al. .................... 701/29 |
| 6,246,935 B1 | 6/2001 | Buckley ....................... 701/36 |
| 6,259,362 B1 | 7/2001 | Lin .............................. 340/457 |
| 6,429,773 B1 | 8/2002 | Schuyler .................. 340/425.5 |
| 6,571,191 B1 * | 5/2003 | York et al. ................... 702/107 |
| 6,757,521 B1 * | 6/2004 | Ying ....................... 455/67.11 |
| 6,807,469 B2 * | 10/2004 | Funkhouser et al. .......... 701/33 |
| 2003/0163587 A1 * | 8/2003 | Knight et al. ............... 709/249 |

* cited by examiner

*Primary Examiner*—Khoi H. Tran
*Assistant Examiner*—Marie A Weiskopf
(74) *Attorney, Agent, or Firm*—Cantor Colburn LLP

(57) ABSTRACT

A handheld device is provided in communication with an EEPROM in a control of a vehicle. Software in the device provides for reading EEPROM settings, writing EEPROM settings, retrieving fault data, a sentry monitoring mode, and flash downloading the control. A system for communicating with the control includes the handheld device, the control including an EEPROM, a communications link between the handheld device and the control, and software loaded into the handheld device for reading and updating settings stored in the EEPROM. A storage medium and a method provides an install tool for installing computer program code onto the handheld device and displaying a main menu, the main menu listing options for communicating between the computer and the EEPROM, the options including EEPROM settings, fault and sentry, and flash download.

32 Claims, 33 Drawing Sheets

Bulk Download

PartName : ▼     NewPart

272    Sw ID & Rev ID :  HL 2A    274

| Fn. | Fn. Name | Value |
|---|---|---|
| 1 | N/A | 100 |
| 2 | N/A | 15 |
| 3 | N/A | 15 |
| 4 | N/A | 255 |
| 5 | N/A | 40 |
| 6 | N/A | 11 |

266

Save | Read | Load | Details | Return

FIG. 22

Part Info

Part Information

290

PartName : GN03

292    294

Done    Cancel

Bulk Download

PartName: ▼ GN03   [NewPart]

Sw ID & Rev ID: DR 1A

| Fn. | Fn. Name | Value |
|---|---|---|
| 1 | Auto regen ena | 1 |
| 2 | Creep speed | 0 |
| 3 | Controlled Acc | 15 |
| 4 | Current limit | 220 |
| 5 | Regen brake ra | 107 |
| 6 | FW ratio | 255 ▼ |

[Save] [Read] [Load] [Details] [Return]

FIG. 24

Bulk Download

PartName: ▼ GN01 / GN02 / GN03   [NewPart]

Sw ID & Rev ID: DR 1A

| Fn. | Fn. Name | Value |
|---|---|---|
| 1 | Auto regen ena | 1 |
| 2 | Creep speed | 0 |
| 3 | Controlled Acc | 15 |
| 4 | Current limit | 220 |
| 5 | Regen brake ra | 110 |
| 6 | FW ratio | 255 ▼ |

[Save] [Read] [Load] [Details] [Return]

METHOD, SYSTEM, AND STORAGE MEDIUM FOR COMMUNICATING WITH VEHICLE CONTROL

FIELD OF THE INVENTION

This invention relates generally to the configuring, controlling, monitoring, and updating of the function settings of a control used in a vehicle, and more particularly, this invention relates to a method and system of using a handheld device for communicating with the vehicle.

BACKGROUND OF THE INVENTION

DC and AC controls are used to support various modes of battery driven vehicles including industrial fork lifts, golf cars, neighborhood vehicles, etc. The controls are installed in the electric vehicle.

Computer desktops including laptops are used to monitor, program and diagnose the controls. However, the desktop software is relatively immobile. In the event of a failure of a control at a remote location, diagnosing the control to ascertain the failure is difficult using desktop software. Either the entire vehicle needs to be brought to the original equipment manufacturer ("OEM") or the control must be removed from the vehicle and then brought in proximity to the desktop. A handset exists which provides information in only numeric data and is difficult to comprehend. The limitations of the handset also include a not so easy to use interface, a less intelligent system then computer software, tedious operations to download a part setting file and inability to reprogram the flash area in the control of an electric vehicle.

BRIEF SUMMARY OF THE INVENTION

The above discussed and other drawbacks and deficiencies of the prior art are overcome or alleviated by a method for communicating with an EEPROM in a control of a vehicle. The method includes setting up a handheld device in communication with the control, starting a program within the handheld device for communicating with the EEPROM, logging in to the control; selecting an option for communicating between the handheld device and the EEPROM, the option chosen from a group of options including reading EEPROM settings, writing EEPROM settings, retrieving fault data, and a sentry monitoring mode, and choosing between selecting an additional option from the group or logging off from the control.

In another exemplary embodiment of the invention, a system for communicating with a control includes a handheld device, a control separate from the handheld device, the control including an EEPROM, a communications link between the handheld device and the control, wherein the handheld device is loaded with software for reading and updating settings stored in the EEPROM.

In another exemplary embodiment of the invention, a storage medium with machine-readable computer program code for communicating with an EEPROM in a control of a vehicle includes instructions for causing a computer to implement a method including providing an install tool for installing the computer program code onto a handheld device housing the computer and displaying a main menu, the main menu listing options for communicating between the computer and the EEPROM, the options including EEPROM settings, fault and sentry, and flash download.

In another exemplary embodiment of the invention, a method for communicating with an EEPROM in a control of a vehicle includes providing an install tool for installing computer program code onto a handheld device housing a computer and displaying a main menu, the main menu listing options for communicating between the computer and the EEPROM, the options including EEPROM settings, fault and sentry, and flash download.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring to the exemplary drawings wherein like elements are numbered alike in the several FIGS.:

FIG. 21 shows a screen shot of an exemplary bulk download screen when the function names in the function settings are not available;

FIG. 22 shows a screen shot of an exemplary part information screen requesting the part name;

FIG. 23 shows a screen shot of an exemplary bulk download screen listing the function settings of the part selected in the part information screen of FIG. 22;

FIG. 24 shows a screen shot of an exemplary bulk download screen selecting a function number for revision;

DETAILED DESCRIPTION OF THE INVENTION

Figure 1:
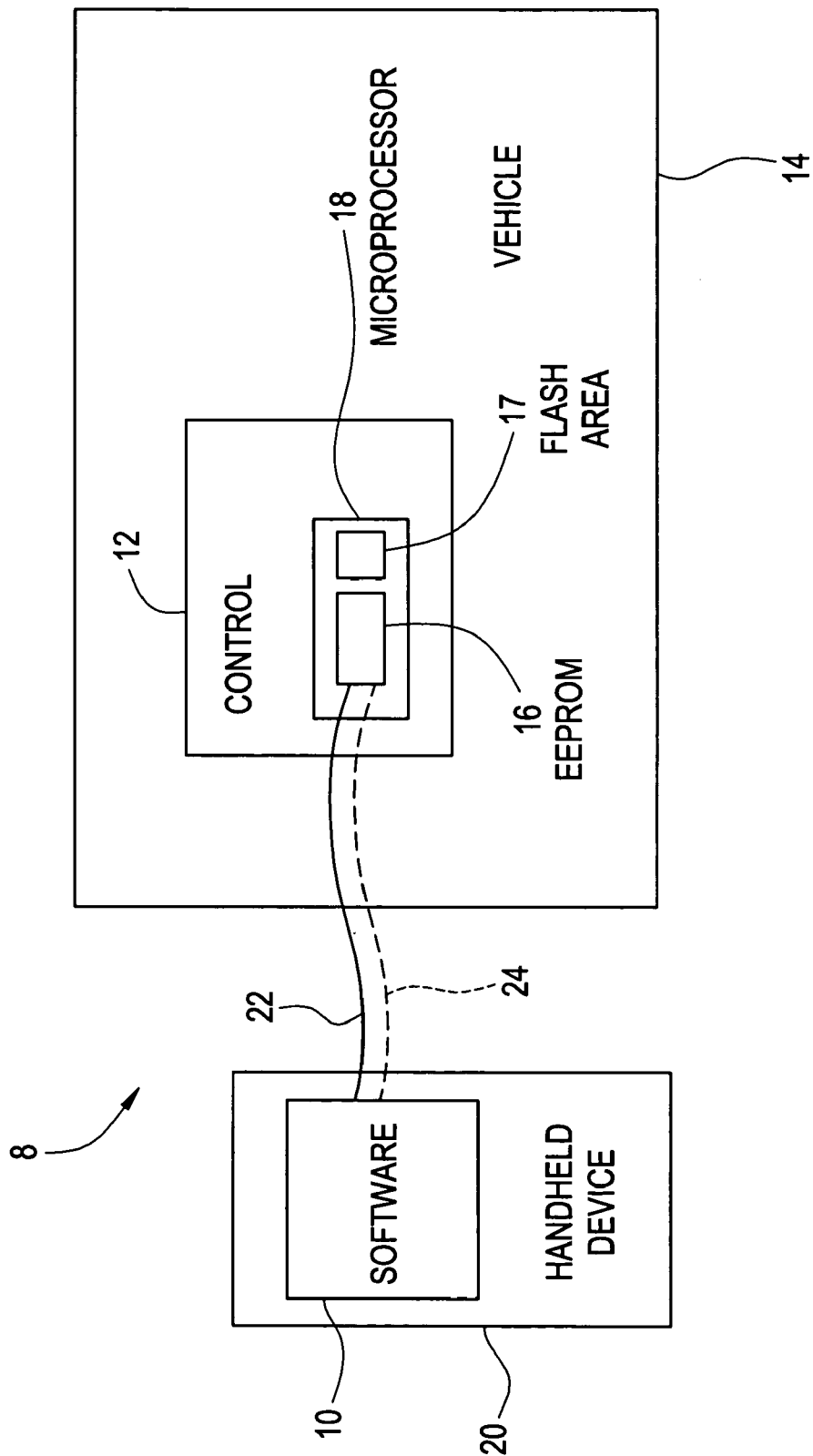
FIG. 1 shows a diagram of an exemplary system for communicating between a handheld device and a control of a vehicle.

A system 8 for using a handheld device 20 in communication with a vehicle 14 is shown in FIG. 1. Software 10 to configure, control, monitor and update the function settings of DC/AC control 12 used in an electric vehicle 14 is described. Controls 12 including 36/48V DC controls and 48/72V AC controls support various modes of battery driven vehicles 14, such as industrial fork lifts, golf cars, neighborhood vehicles, etc. and the controls 12 are installed in the electric vehicles 14. It should be noted that other controls 12 and vehicles 14 would also be within the scope of this invention, as well as controls 12 installed in alternate mechanical devices other than vehicles. The software 10 is able to modify the heart of the program, the firmware, based on a file located on the device. The software 10 is also flexible enough to be programmed at the control 12 itself rather than being brought to a fixture or a programming workstation.

The control 12 is driven by the firmware which may reside in the flash area 17. It should be noted, however, that the flash area 17 is an optional component based on the functionality and model of the control 12, and therefore not all controls 12 may include the flash area 17. A plurality of parameters are stored in the EEPROM area 16 of the microprocessor 18 residing in the control 12. The type and value of the parameters residing in the control 12 define the personality of the control 12. These parameters, alternatively called function settings, are responsible for altering the running conditions of the control 12 and thus the vehicle 14 or mechanical device itself.

The software 10 may be provided on a handheld device 20 that provides relevant information to the user and which is easily comprehended. The handheld device 20, that is, a handheld computer, is used for programming the controls 12 and monitoring the parameters of the control 12. The software 10 may be designed to allow programming the flash area 17 and thus providing firmware, configure and monitor the values of parameters residing in EEPROM area 16, clone the parameters and diagnose the faults in the control 12 and notify the user of the same.

A method of using the handheld computer 20 enables the user to program the electric vehicle control 12 near the control 12 itself. The firmware may be loaded into the control 12 with the software program 10 itself without having the need to move to the serial programmer. The loading of the firmware and the function settings may be carried out by the software 10 housed in the portable and mobile handheld device 20 with either serial connection 22 or wireless communication using infra red rays 24. The software program 10 loaded in the handheld device 20, which may include a variety of pocket personal computers, may be designed to diagnose the faults, if there are any, in the control 12 and provide necessary information regarding the same.

The mobility of the software 10 provides the user with the ability to use the software 10 on the control 12 without needing to physically remove the control 12 from the vehicle 14. The mobility of the software 10 also helps in diagnosing the faults, if any, on the field without needing to bring the vehicle 14 or the control 12 back to the OEM.

The software 10 may help increase productivity by accessing any EEPROM setting, quickly perform maintenance, diagnostic and troubleshooting tasks without the help of any additional test equipment. The software 10 directly links to the microprocessor 18 residing in the AC/DC control 12. The software 10 may assist the OEM of the electric vehicles 14 in the application, installation and service of solid-state controls 12. The program 10 may provide a quick and convenient access to diagnostic information and operating parameters within the controls 12, without the need for external meters, scopes or diagnostic aids. This program 10 is organized to allow a user access the fullest amount of data authorized by the vehicle OEM, while restricting access to data or settings that may cause vehicle mis-operation or unexpected behavior.

Turning now to FIGS. 2-7, the diagrammatic representation of the complete functionality of the tool is explained. The program 10 is helpful when re-programming quantities of controls 12 with function settings that differ from those loaded in the factory on the production line. The program 10 may be able to cater and work similarly for a variety of various models and variants of the controls 12.

Figure 2:
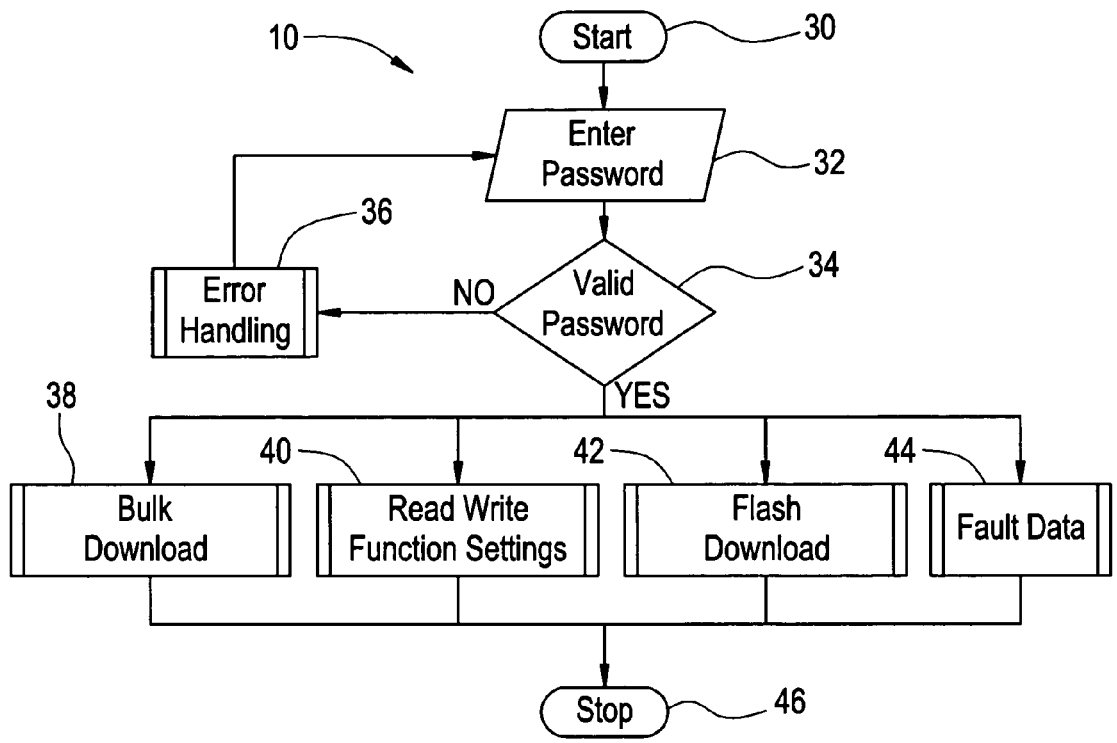
FIG. 2 shows a flowchart of the overall functionality of exemplary software installable in the handheld device of FIG. 1.

As shown in FIG. 2, the program 10 begins at a start block 30. At block 32 the program 10 prompts the user for and receives a password. At block 34, the program 10 determines if the password is valid. If the password is not valid, the program 10 continues to an error handling subprogram 36 further described in FIG. 3. After block 36, the program 10 loops back to block 32 for receiving the password. If the password is determined to be valid at block 34, then the program may continue to one of blocks 38, 40, 42, and/or 44, as determined or chosen by the user. Block 38 defines a bulk download of information process, block 40 defines a read/write function settings process, block 42 defines a flash download operation (for use if the control includes a flash area 17), and block 44 defines a fault data operation. After one or more of these processes 38, 40, 42, and 44, the program may come to a stop at block 46.

Figure 3:
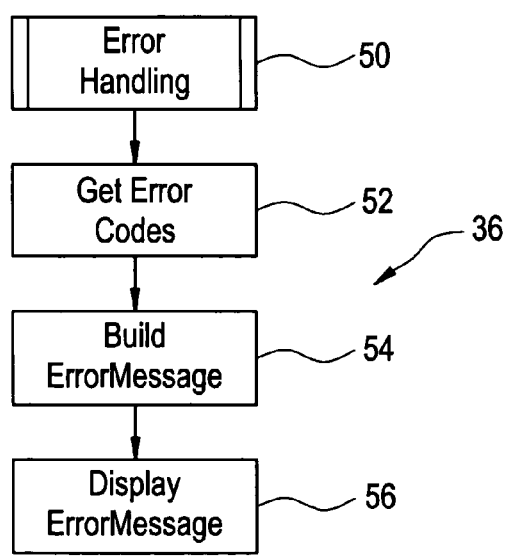
FIG. 3 shows a flowchart for error handling in the software.

Turning now to FIG. 3, the subprogram 36 for error handling is shown. The error handling program 36 begins at block 50 which initiates the subprogram 36. At block 52, the subprogram 36 retrieves error codes. At block 54, an error message is built, and at block 56 an error message is displayed on a display screen of the handheld device 20. In addition to processing an invalid password as shown in FIG. 2, the error handling subprogram 36 may be utilized at various points within the program 10, as will be further described.

Figure 4:
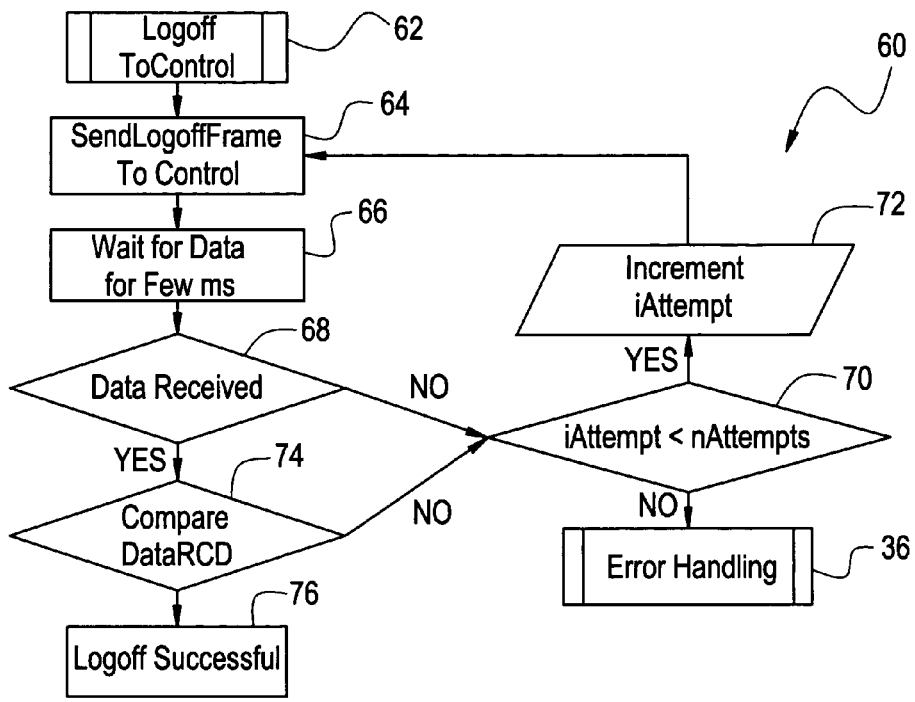
FIG. 4 shows a flowchart for logging off from the control.

Turning now to FIG. 4, a flowchart/subprogram 60 shows how the program 10 logs off from the control 12. The flowchart 60 starts at block 62. At block 64, a log off frame is sent to the control 12. At block 66, the subprogram 60 pauses for a few ms while waiting from data. At block 68, the subprogram 60 determines if data is received. If data is not received, then the flow continues to block 70 to determine if there are still any attempts left in the preset number of attempts to receive data. If there are still attempts left to receive data, then the flow continues to block 72 where the increment of attempts increases. Then the flow loops back to block 64 where a log off frame is sent to control. If there are no attempts left, that is, if iAttempt (an incremental number) is not less than nattempts (a present number of attempts), then the flow would continue to the error handling subprogram 36. If at block 68 data is received, then the flow of the subprogram 60 continues to block 74 where the data received is compared. That is, the data received from the control 12 is compared with the data sent to the control 12. At this point, if the data compared is not equal (such as each and every byte), then the subprogram would return to block 70 to determine if there are still any attempts left in the preset number of attempts to receive data. However, if the data is compared at block 74 and is equal (such as each and every byte), then the subprogram 60 would be completed with a successful log off at block 76.

Figure 5:
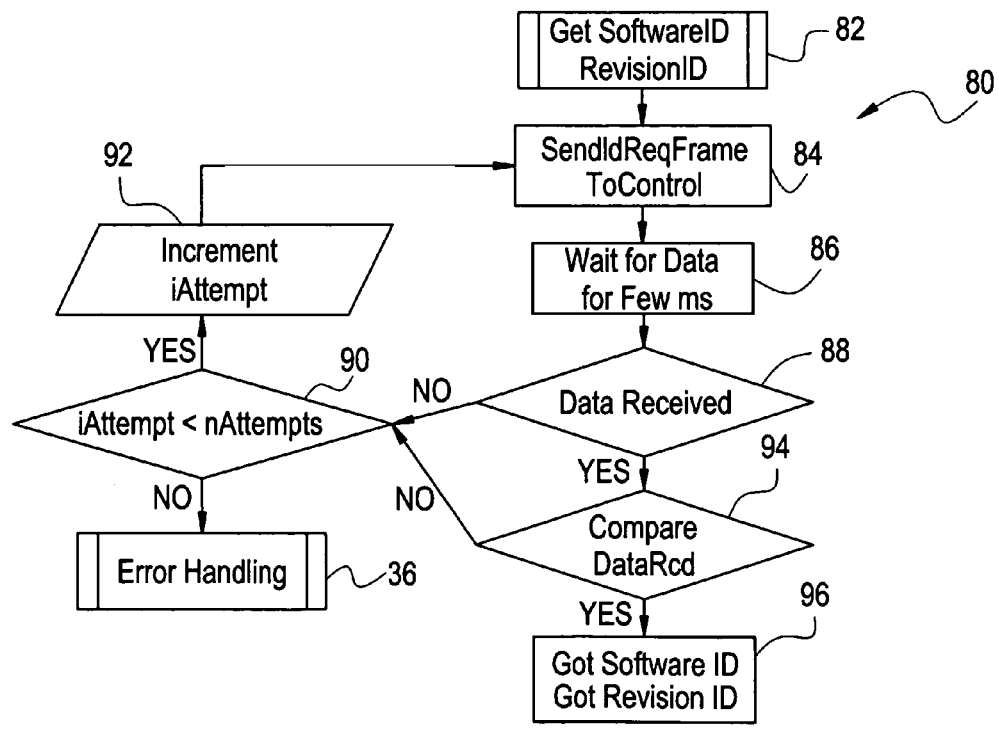
FIG. 5 shows a flowchart for retrieving software ID and revision ID from the control.

FIG. 5 shows a flowchart, or subprogram 80 of the program 10, for getting software ID and revision ID from the control 12. The flowchart 80 starts at block 82. At block 84, an ID request frame is sent to the control 12. At block 86, the subprogram 80 pauses for a few ms while waiting from data. At block 88, the subprogram 80 determines if data is received. If data is not received, then the flow continues to block 90 to determine if there are still any attempts left in the preset number of attempts to receive data. If there are still attempts left to receive data, then the flow continues to block 92 where the increment of attempts increases. Then the flow loops back to block 84 where an ID request frame is sent to the control 12. If there are no attempts left, that is, if iAttempt (an incremental number) is not less than nAttempts (a present number of attempts), then the flow would continue to the error handling subprogram 36. If at block 88 data is received, then the flow of the subprogram 80 continues to block 94 where the data received is compared. That is, the byte length of the frame received and the frame sent by the palm may be compared to see if they are the same. At this point, if the data compared does not have the same byte length (of the frame received and the frame sent by the handheld device 20), then the subprogram would return to block 90 to determine if there are still any attempts left in the preset number of attempts to receive data. However, if the data is compared at block 94 and has the same byte length (of the frame received and the frame sent by the handheld device 20), then the subprogram 80 would be completed with a successful receipt of software ID and revision ID at block 96.

Figure 6:
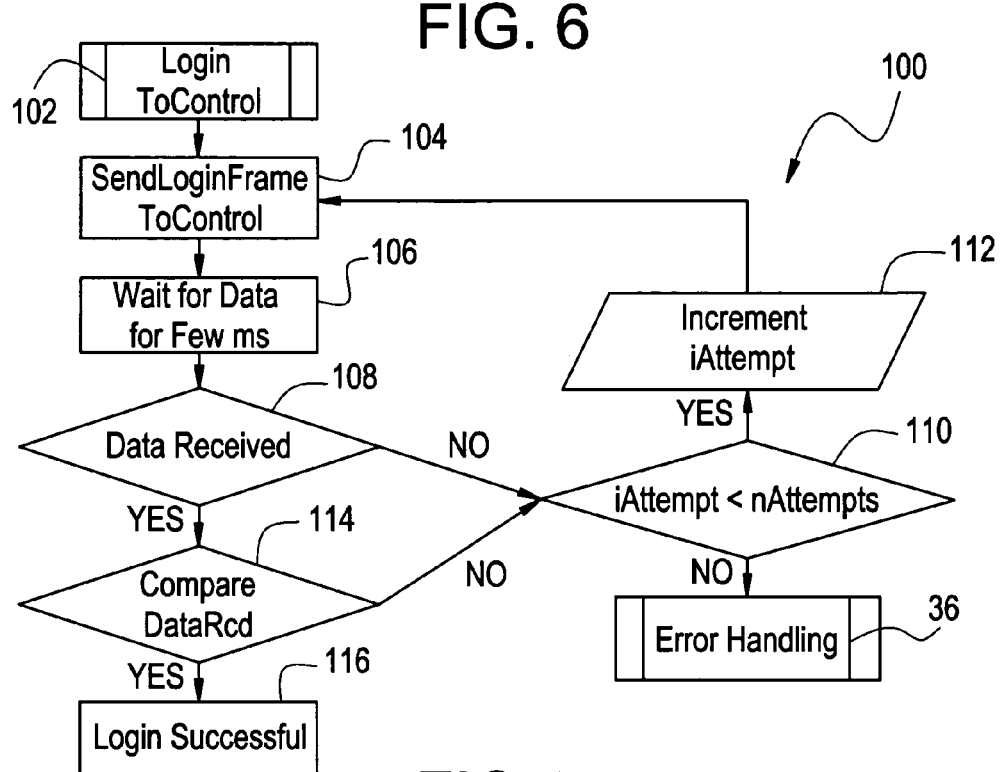
FIG. 6 shows a flowchart for logging in to the control.

FIG. 6 shows a flowchart, or subprogram 100 of the program 10, for logging in to the control 12. The flowchart 100 starts at block 102. At block 104, a log in frame is sent to the control 12. At block 106, the subprogram 100 pauses for a few ms while waiting from data. At block 108, the subprogram 100 determines if data is received. If data is not received, then the flow continues to block 110 to determine if there are still any attempts left in the preset number of attempts to receive data. If there are still attempts left to receive data, then the flow continues to block 112 where the increment of attempts increases. Then the flow loops back to block 104 where a log in frame is sent to the control 12. If there are no attempts left, that is, if iAttempt (an incremental number) is not less than nattempts (a present number of attempts), then the flow would continue to the error handling subprogram 36. If at block 108 data is received, then the flow of the subprogram 100 continues to block 114 where the data received is compared to see if the frame received and the frame sent by the handheld device 20 has the same byte length and content. At this point, if the data compared does not have the same byte length and contents (of the frame received and the frame sent by the handheld device 20), then the subprogram would return to block 110 to determine if there are still any attempts left in the preset number of attempts to receive data. However, if the data is compared at block 114 does not have the same byte length and contents (of the frame received and the frame sent by the handheld device 20), then the subprogram 100 would be completed with a successful log in at block 116.

Figure 7:
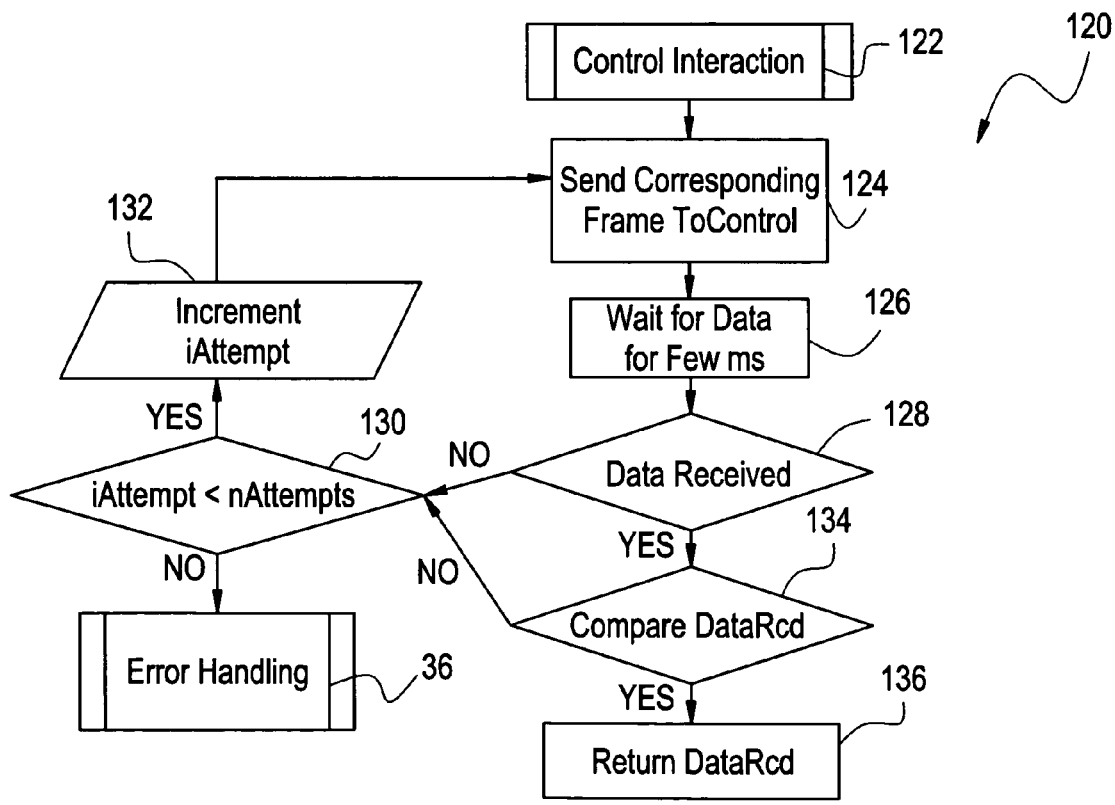
FIG. 7 shows a flowchart for controlling interactions.

FIG. 7 shows a flowchart, or subprogram 120 of the program 10, for controlling interactions with the control 12. This flowchart is for control interactions, that is, to read data from EEPROM area 16, to write data to EEPROM area 16, to read data from RAM area, to write data to RAM area, to read data from FLASH area 17 and to reset the control 12. The flowchart 120 starts at block 122. At block 124, a corresponding frame (that is, corresponding to the operations described such as read/write of EEPROM/RAM/FLASH area or the reset of control) is sent to the control 12. At block 126, the subprogram 100 pauses for a few ms while waiting from data. At block 128, the subprogram 120 determines if data is received. If data is not received, then the flow continues to block 130 to determine if there are still any attempts left in the preset number of attempts to receive data. If there are still attempts left to receive data, then the flow continues to block 132 where the increment of attempts increases. Then the flow loops back to block 124 where a corresponding frame is sent to the control 12. If there are no attempts left, that is, if iAttempt (an incremental number) is not less than nattempts (a present number of attempts), then the flow would continue to the error handling subprogram 36. If at block 128 data is received, then the flow of the subprogram 120 continues to block 134 where the data received is compared to determine if the data of the frame received and the frame sent by the handheld device 20 has the desired byte length. At this point, if the data compared does not have the desired byte length (of the frame received and the frame sent by the handheld device 20), then the subprogram would return to block 130 to determine if there are still any attempts left in the preset number of attempts to receive data. However, if the data is compared at block 134 does not have the desired byte length (of the frame received and the frame sent by the handheld device 20), then the subprogram 120 would be completed with a successful return of data received at block 136.

Figure 8:
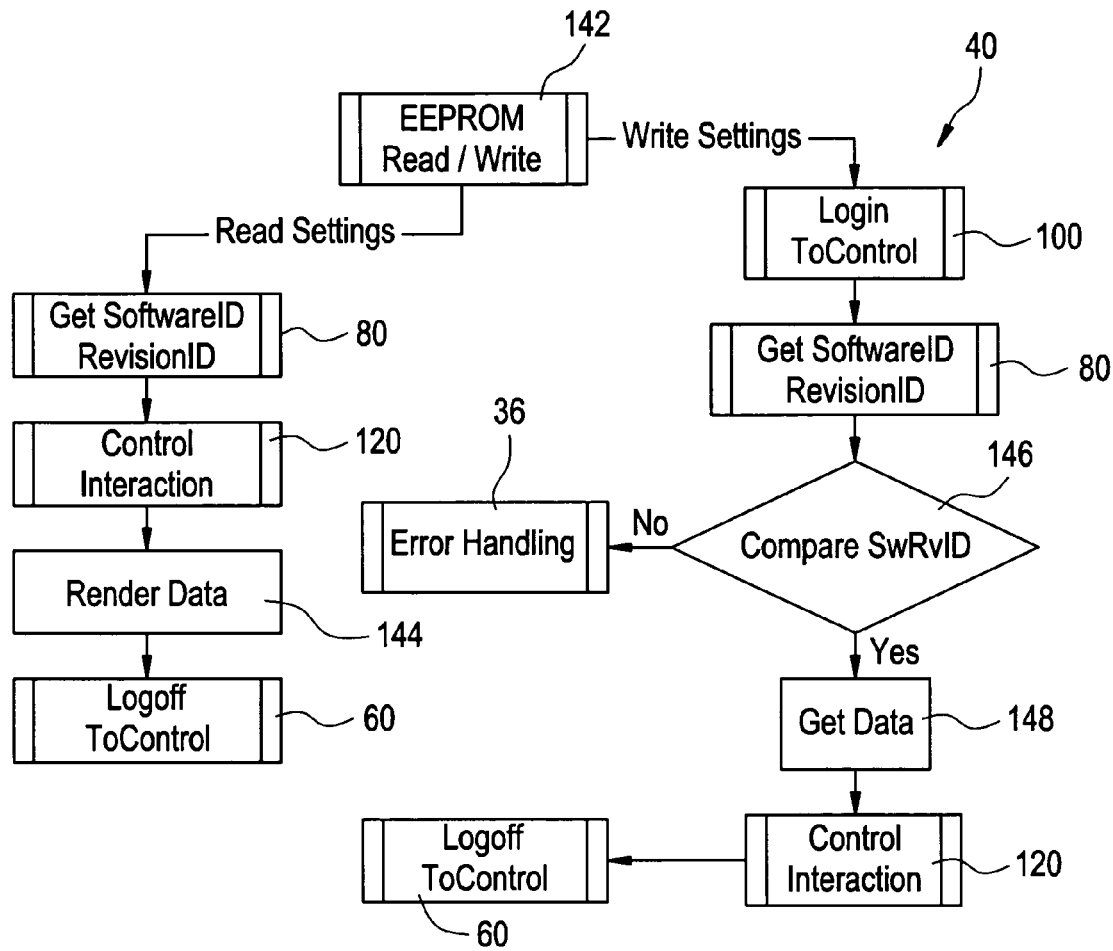
FIG. 8 shows a flowchart for reading and writing EEPROM settings in the control.

A diagrammatic representation of EEPROM Read/Write operation or subprogram 40 is demonstrated in FIG. 8, and forms a part of the overall program 10 as shown in FIG. 2. The subprogram 40 starts at block 142 and may be initiated by user input to either read or write to the EEPROM 16. If the user or automatic entry chooses to read the settings of the EEPROM 16, then the flow will continue to subprogram 80, as described in FIG. 5, for obtaining software ID and revision ID. Then, the interactions will be controlled by subprogram 120, as described in FIG. 7. Data will be rendered at block 144 for reading followed by a log off to the control operation, subprogram 60 as described in FIG. 4. The reading of settings also defines the bulk download 38 shown in FIG. 2.

If the user or automatic entry chooses to write settings to the EEPROM 16, then a log in operation must be performed at block 100, the subprogram for logging in to the control 12 as described in FIG. 6. Then the flow will continue to subprogram 80, as described in FIG. 5, for obtaining software ID and revision ID. At block 146, the software ID and revision ID are compared to that in the control 12 and if they do not match, than the error handling subprogram 36 is called. If the software ID and revision ID is accurate, then data will be received at block 148, that is, data to be written to the control 12 from the software 10. The interactions of this process are controlled by the subprogram 120, and then logoff to control is accomplished by subprogram 60. It should be noted that while reading the EEPROM may be enabled, writing to the EEPROM may be denied if the software ID and revision ID do not check out, since overwriting data in the EEPROM 16 may deleteriously affect the control 12 if the function settings are not proper.

Figure 9:
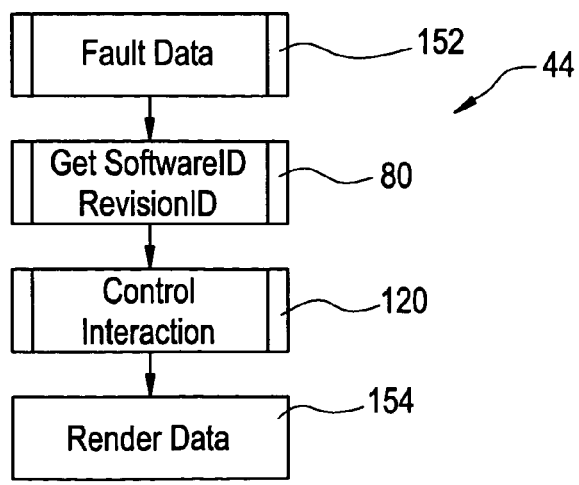
FIG. 9 shows a flowchart for fault data operations.

The software 10 also allows the user to diagnose and troubleshoot any faults which may occur. The faults of the control 12 are stored in EEPROM area 16 and the software program 10 uploads the faults and displays it for the user on an easy-to-use interface on the device 20. The software 10 may further provide useful description of the fault. This provides greater flexibility to the user as it reduces the downtime of the control 12. The diagrammatic representation of fault data operation 44 is shown in FIG. 9. The fault data operation 44 forms part of the overall program 10 as shown in FIG. 2. The fault data operation 44 starts at block 152, and continues to the subprogram 80, as described in FIG. 5, for obtaining software ID and revision ID. The interactions for the fault data operation 44 are controlled by subprogram 120, as described in FIG. 7. Fault data is then rendered at block 154.

Figure 10:
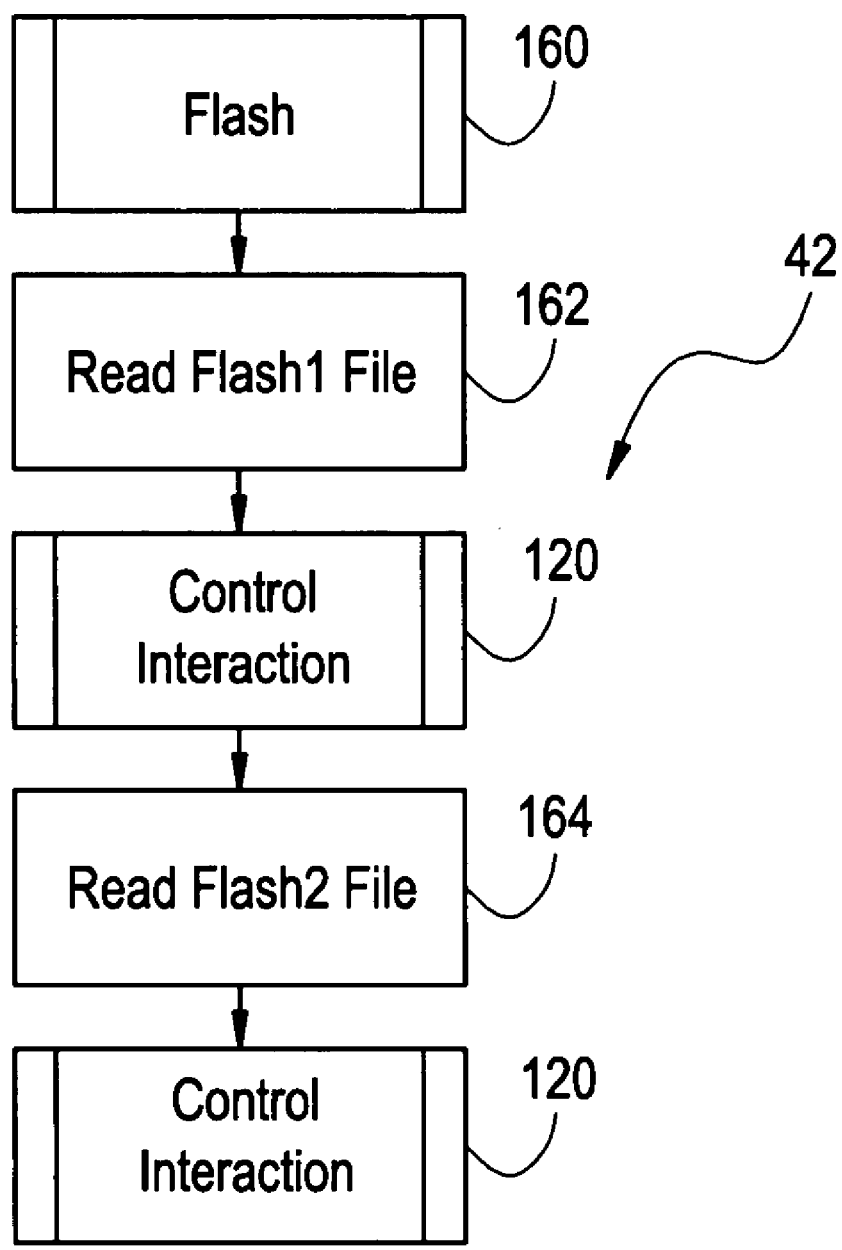
FIG. 10 shows a flowchart for flash download operations.

In certain models, flash memory locations 17 may be within the control 12 and permit the rewriting or upgrading of software after the initial programming at the factory. The software 10 allows the user to reprogram the flash area 17, without the use of a serial programmer and without the need of physically taking the control 12 to a workstation. With the system 8, the OEM may be able to carry the handheld device 20 to the electric vehicle 14 and connect the control 12 to the handheld device 20 (using RS-232 line 22 or by establishing line of contact for infra red communication 24) and start programming the flash area 17. A diagrammatic representation of flash operation 42 is shown in FIG. 10. The flash operation 42 forms part of the overall software 10 as shown in FIG. 2. The flash operation 42 starts at block 160 and then reads flash 1 file. Interactions are controlled by subprogram 120 as described in FIG. 7. Then, flash 2 file is read at block 164 and the interactions are controlled by subprogram 120. (Although not shown, it should be understood that the flash area 17 may be further divided into two parts—Flash 1 area and Flash2 area, depending upon the architecture of the microprocessor 18).

The program or software 10 may be stand-alone executable software which may run on such products as the Palm M125 and Palm M500 devices (Palm is a registered trademark of Palm, Inc., the Palm logo and Palm Powered logo are the trademarks of Palm, Inc.), however the software may also be designed to run on alternate products. Also, the software 10 may be designed to be compatible with such products as the GE "ZX" or GEN II protocol family of controllers by General Electric Company and used in various electric vehicles, such as electric fork trucks, on-road and off-road utility vehicles, golf cars, service vehicles, aerial work platforms, and neighborhood electric vehicles, although it would be within the scope of this invention to utilize the software with other families of controllers and with alternate vehicles and devices.

With the software 10, the user may access any EEPROM setting in the EEPROM 16, quickly perform various maintenance, diagnostic, and trouble-shooting tasks without the aid of additional test equipment. The software 10 may link directly to the microprocessor 18 in the controller 12. The software 10 may provide the additional following functions: ability to download EEPROM parameter settings onto the control 12 (program a card); ability to create new EEPROM parameter settings and store them in a database; ability to modify existing EEPROM parameter settings and store them in a database; ability to read the EEPROM settings from the control 12 (read a card); ability to logon to the device, confirming the software ID and revision; ability to read and write to a single EEPROM location without the need to upload/download all settings; ability to read the last 16 stored fault codes (although the ability to read more or less of the last stored fault codes would also be within the scope of the software 10); ability to monitor real time control variables and acquire and display the maximum and minimum values during vehicle operation; and ability to restrict the features available to the user based on his access rights. Although specific abilities are described with respect to the software 10, it is also within the scope of the system 8 to provide more or less abilities to the software 10 to meet various levels of complexity and cost factors.

Figure 11:
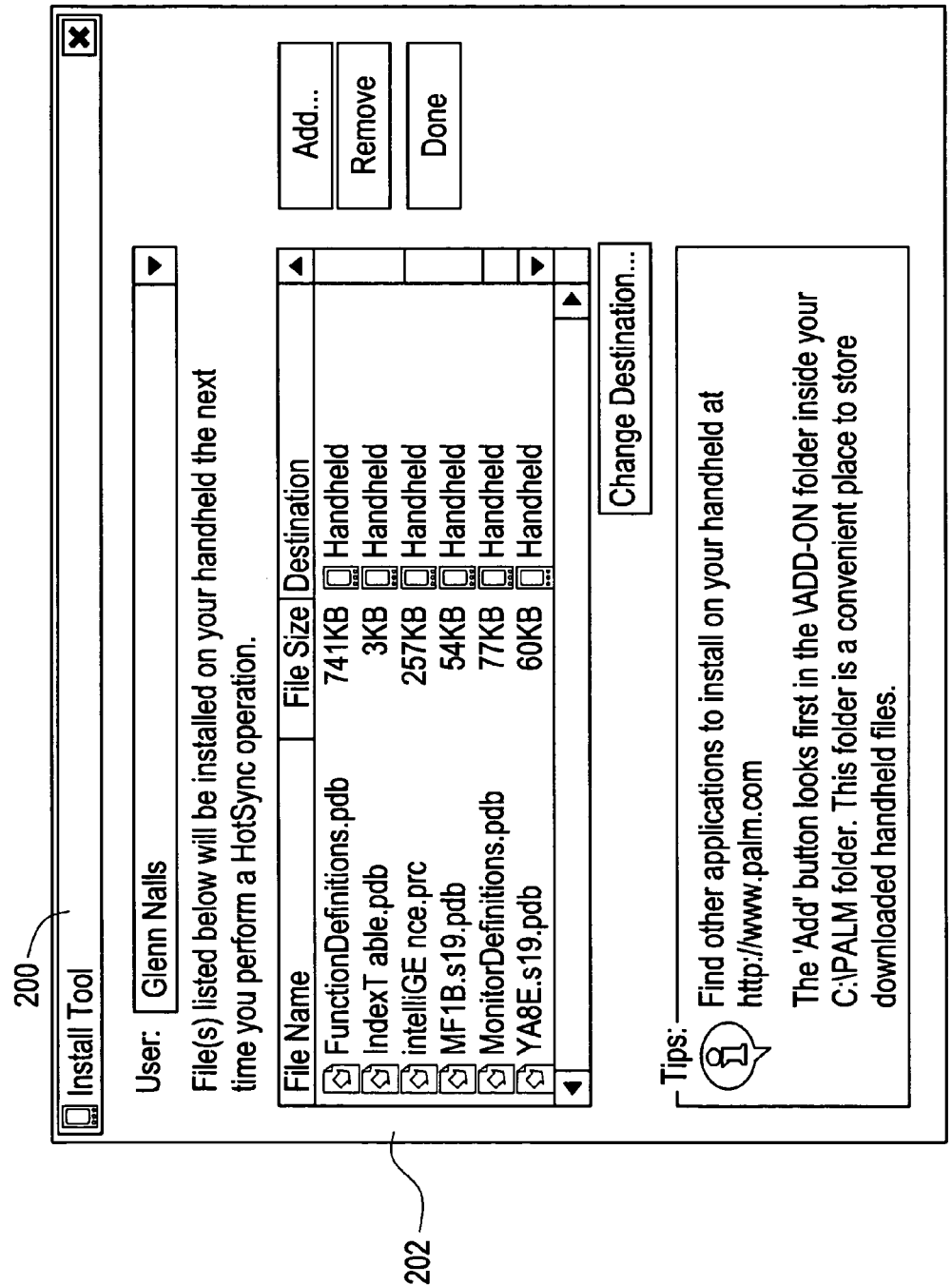
FIG. 11 shows a screen shot of an exemplary install tool for the software.

The software 10 is preferably easy to use being menu and prompt driven. The software 10 may be loaded using the instructions supplied with the handheld product 20 as long as the minimum system requirements that are supplied with the handheld are met. All program and database files supplied on a software disk containing the software 10 may be loaded using a handheld desktop application supplied with the handheld product 20. For example, if the Palm product is the handheld device 20, then the Palm Desktop Install Tool may be used to HotSync files to the handheld (HotSync is a registered trademark of Palm, Inc.). An exemplary screen shot of the install tool screen 200 is shown in FIG. 11. The install tool screen 200 may include a listing 202 of the file or files that will be installed on the handheld 20.

Figure 12:
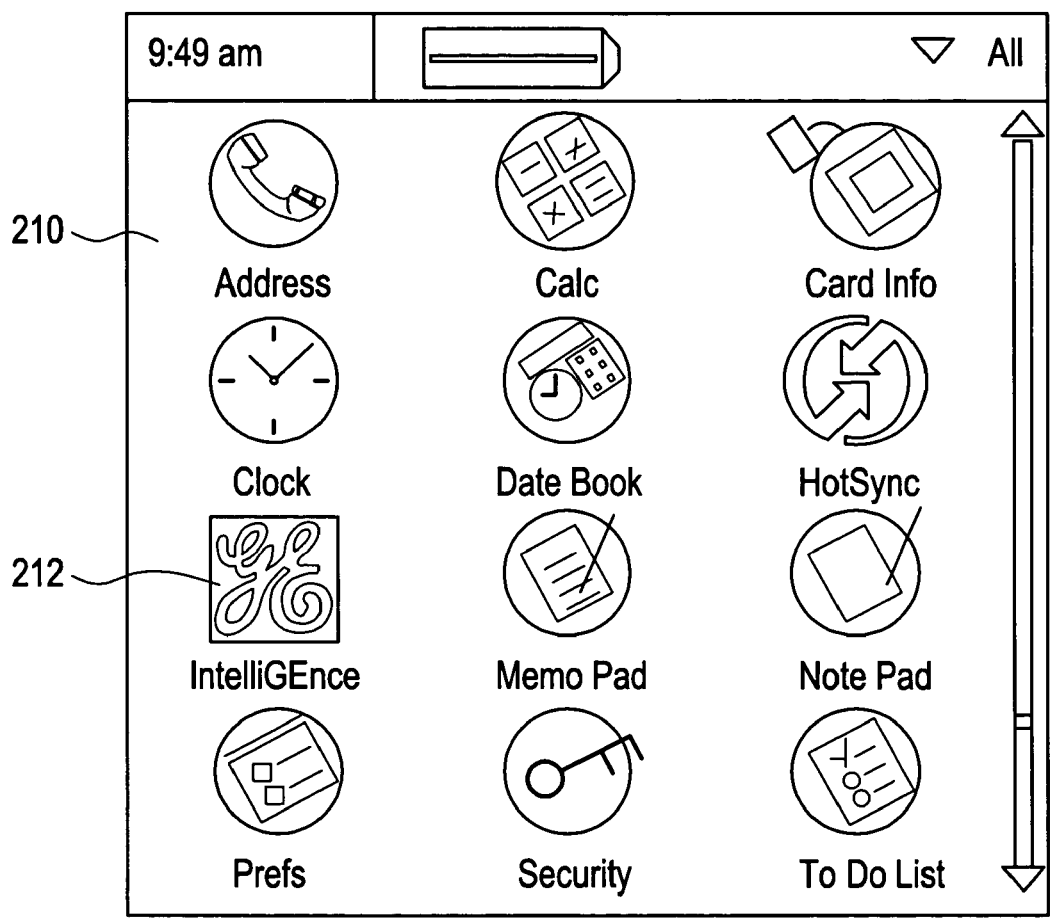
FIG. 12 shows a screen shot of an exemplary application launcher on a handheld device.

Turning now to FIG. 12, once the software 10 is installed, to open the program, the software file listed in an application launcher 210 may be tapped, or otherwise selected from a display screen on the handheld 20. For example, an exemplary logo 212 for starting the program may be the GE logo with the word intelliGEnce (the GE logo is a registered trademark and intelliGEnce is a trademark of General Electric Company).

Figure 13:
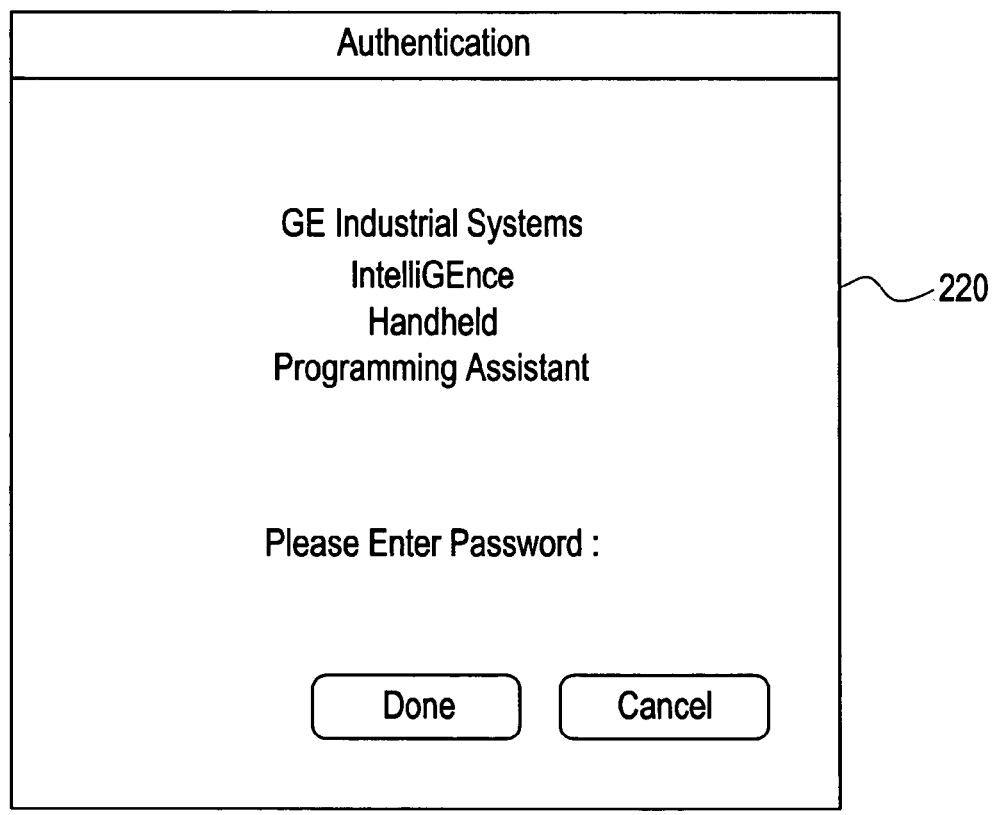
FIG. 13 shows an exemplary screen shot requesting a password.

As shown in the screen shot 220 in FIG. 13, the program may request an access rights password. In one embodiment, the access rights password may be case-sensitive. Furthermore, to maintain data integrity, there may be multiple levels of access in the software 10. For example, a basic level of access may allow an operator to utilize the software monitoring features, as well as read settings from controls, but the read/write and download functions may be disabled. A second level of access may allow use of both the software monitoring features and the programmer features of the software 10, including read/write and download of settings, however access to the flash capabilities of the software 10 may be denied. A highest level of access may allow full utilization of all functions of the software 10, including the ability to use the flash loader for software upgrades on applicable controls. While three levels of software access are disclosed, it should be understood that more or less levels of software access would be within the scope of the software design, depending on the anticipated needs for certain levels of security.

The access password may be issued to users by the vehicle OEM. Without this password, all access to the software 10 may be denied. If there is a need to change the level of access required for a user, the initial installation of the software 10 may be removed from the hard drive, and the installation process repeated.

Figure 14:
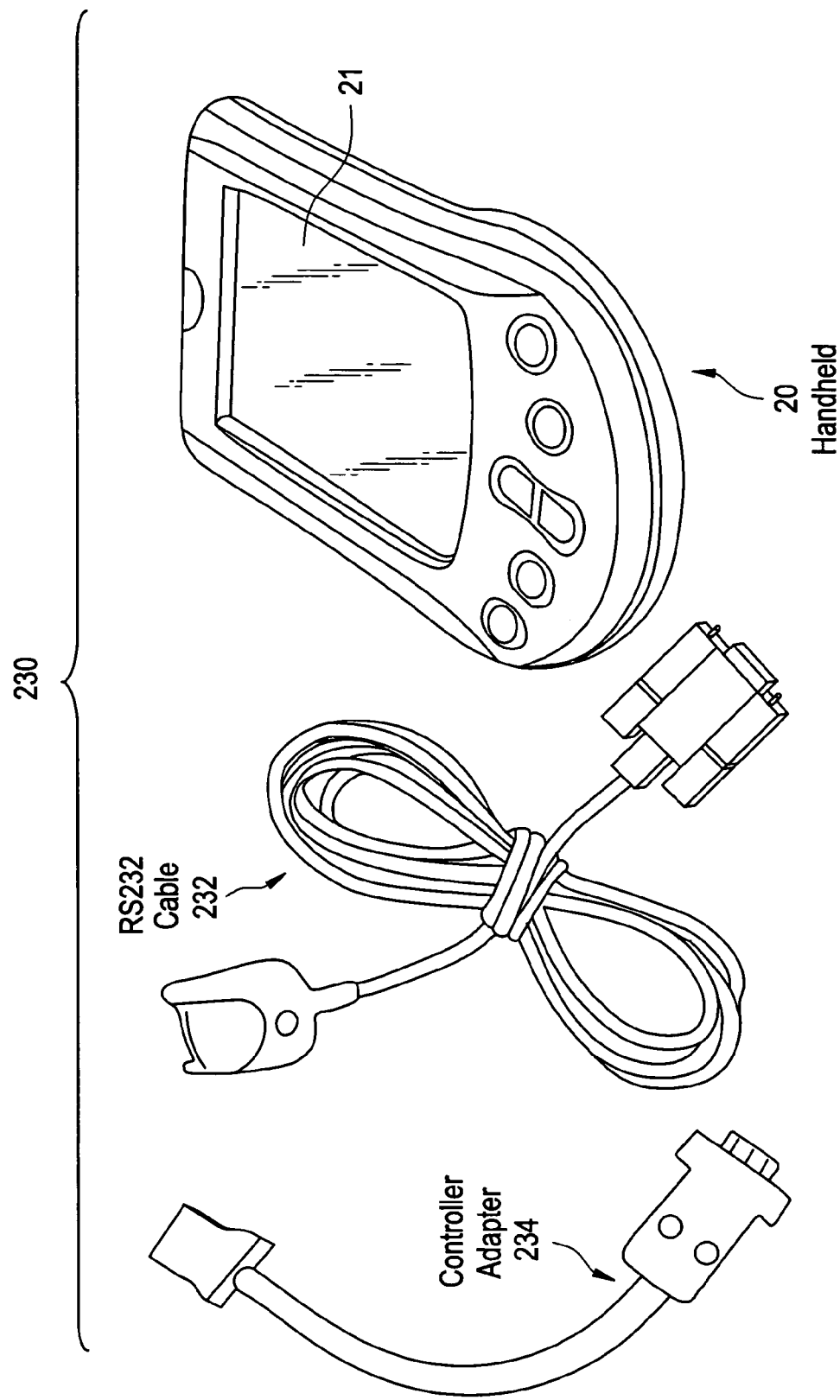
FIG. 14 shows a perspective view of a handheld device and connector assembly.

A handheld device and connector assembly 230 for assembling an RS232 interface between the computer (handheld 20) and the control 12 using an RS232 cable 232, an RS232 to controller cable adapter 234 may be necessary to facilitate the communication between the handheld device 20 and the control 12, as shown in FIG. 14. As the PY plugs are different in different types of controls 12, varying adapters 234 may be required to cover the range of available controls 12. When performing this assembly, it may be necessary to verify that the vehicle 14 has its battery plugged in and its key switch set to the "off" position when connecting the computer (handheld device 20) to the control 12 for proper operation of the program. It should also be understood that a line of contact for infra red communication 24 may also serve to interface the handheld 20 with the control 12. Alternate methods of communication are also within the scope of this assembly 8.

For utilizing EEPROM features, the software 10 may provide a way to program the control 12 or card by downloading EEPROM parameter settings from a database to the control 12. This feature is helpful when re-programming quantities of controls with settings that differ from those loaded in the factory on the production line. Certain settings may be modified and downloaded to a control card, while others may only be modified by the software manufacturer. In order for changes to the EEPROM settings to take effect, the user may have to disconnect the vehicle battery and wait for a predetermined time period, such as a couple minutes, before reconnecting the battery.

Figure 15:
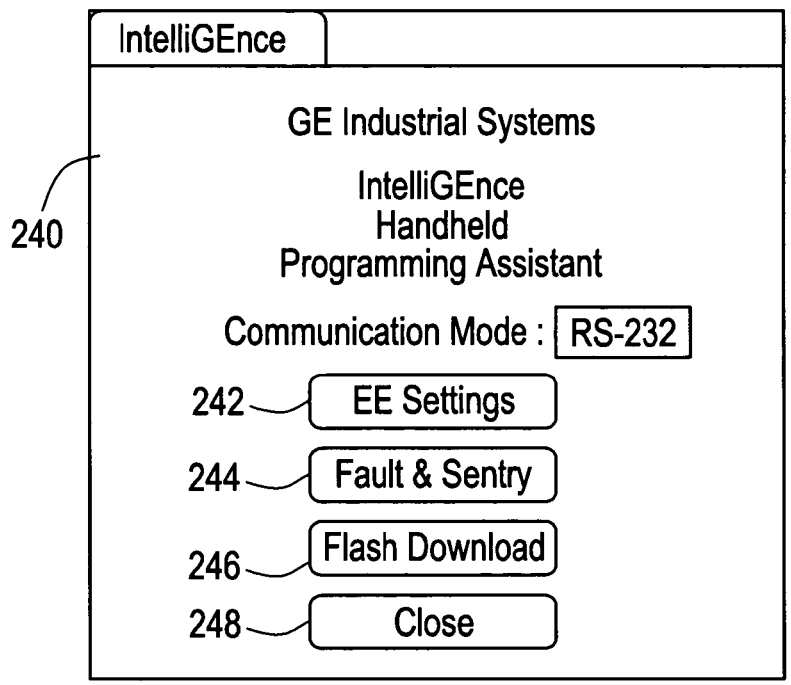
FIG. 15 shows a screen shot of an exemplary main screen including menu options for the program.
Figure 16:
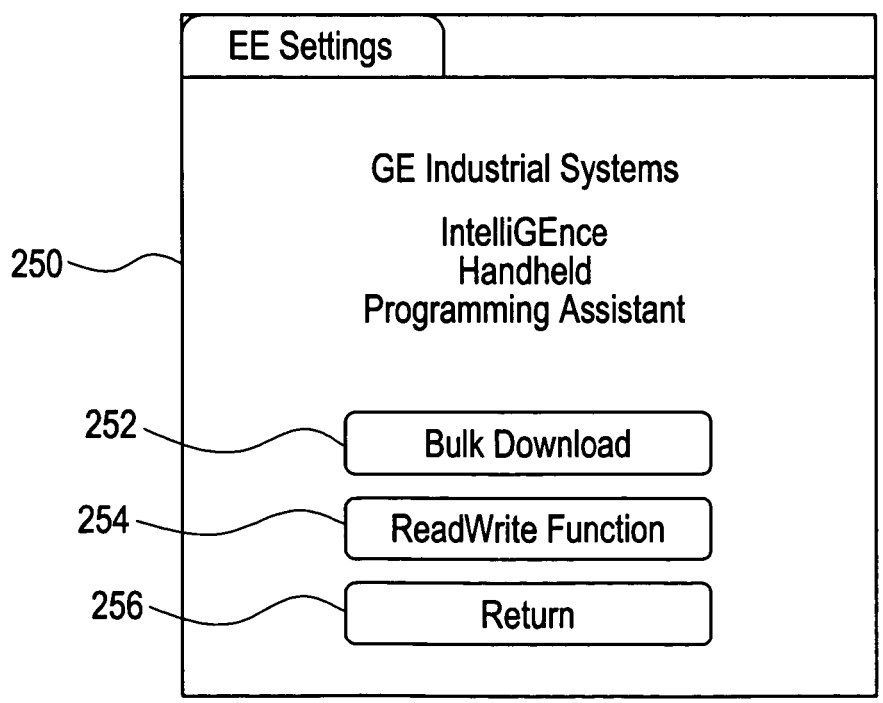
FIG. 16 shows a screen shot displaying exemplary options for EEPROM settings.
Figure 17:
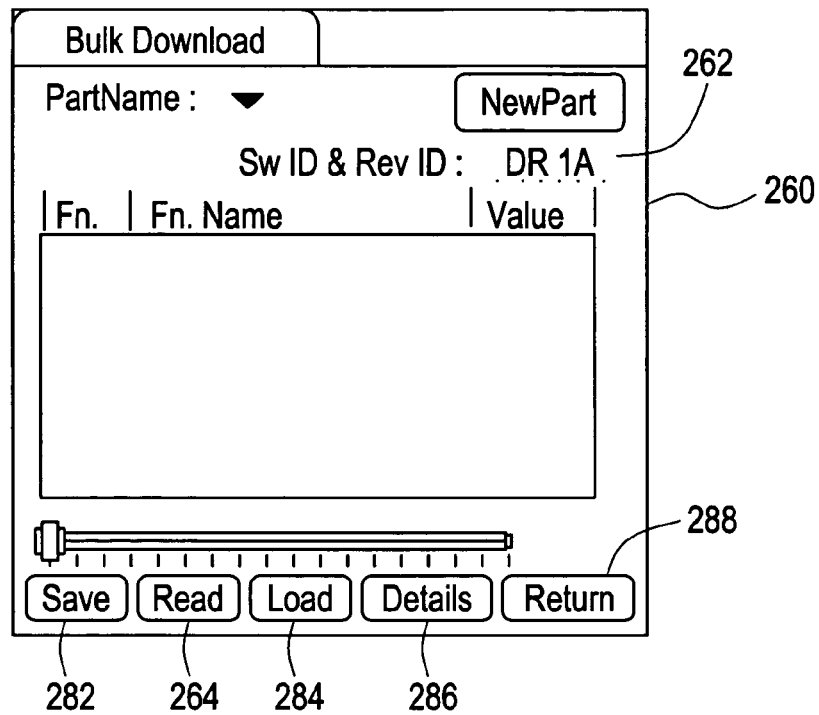
FIG. 17 shows a screen shot displaying an exemplary bulk download screen prior to reading data.
Figure 18:
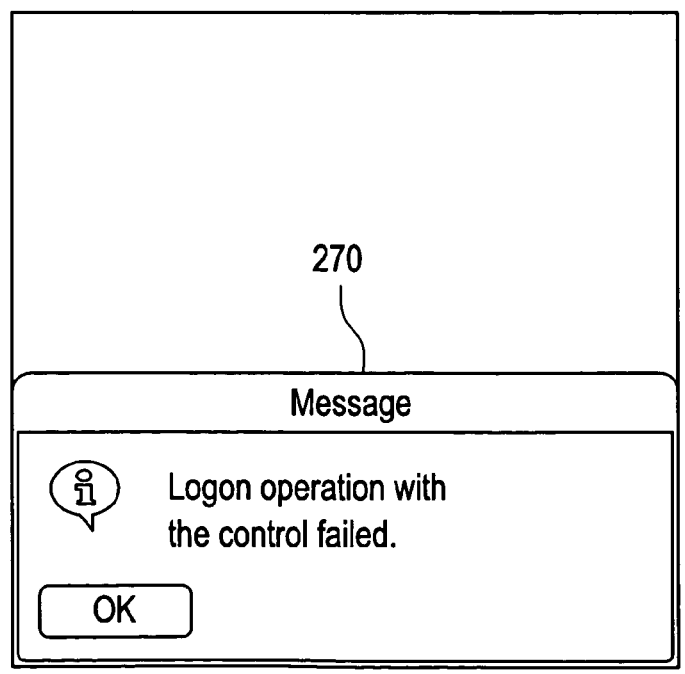
FIG. 18 shows a screen shot of an exemplary error message when logging on to the control has failed.

As shown in FIG. 15, the main screen 240 may contain selectable options including EE Settings 242, Fault & Sentry 244, Flash Download 246, and Close 248, although an alternate selection of options and identifiers would be within the scope of the software 10. The "EE Setting" option 242 on the main screen 240 may be tapped or otherwise selected to reveal the screen 250 shown in FIG. 16, including exemplary menu choices Bulk Download 252, ReadWrite Function 254, and Return 246. The menu choice "Bulk Download" option 252 may be selected, and then a "Bulk Download" screen 260 such as shown in FIG. 17 may appear. The Bulk Download screen 260 may include menu option buttons such as save 282, read 264, load 284, details 286, and return 288. If there is a problem with the connection to the controller 12, a message 270 shown in FIG. 18 may be displayed. Any connection problem may need to be resolved before continuing. If the proper connection is made, the current software name and its revision will be displayed in the "Sw ID & Rev ID" field 262 in the screen 260 shown in FIG. 17.

Figure 19:
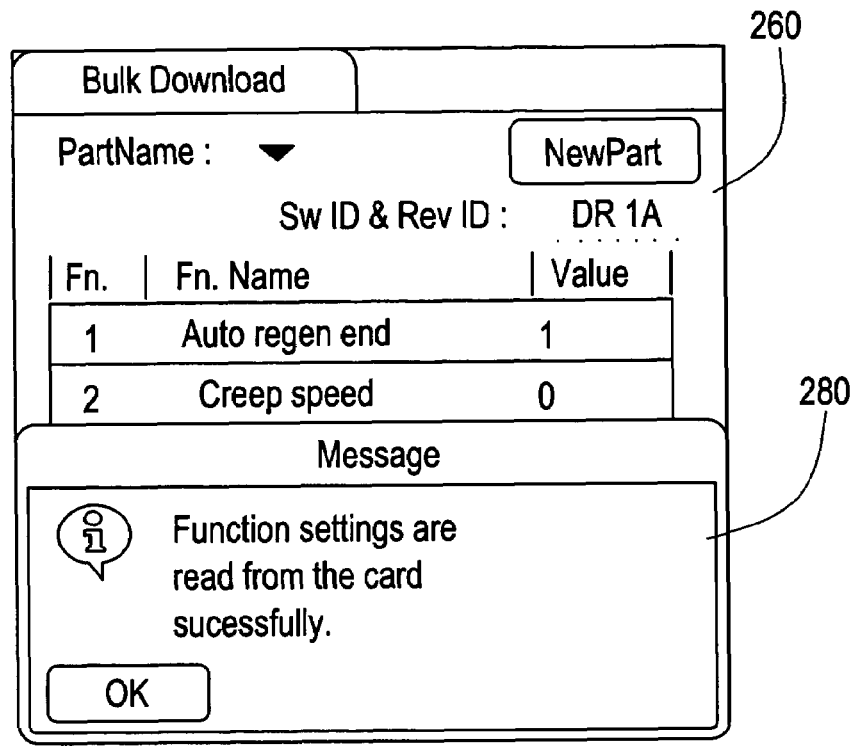
FIG. 19 shows a screen shot of an exemplary bulk download screen and an exemplary message indicating that the function settings are successfully read.

For reading existing control EEPROM settings, a data file may also be read from one control to duplicate settings from one control to another. The "Read" icon 264 may be selected from the screen 260 and the EEPROM settings may be downloaded and displayed on the display screen 21 of the handheld 20. A message 280 may be displayed as shown in FIG. 19 that indicates that the download is successful.

Figure 20:
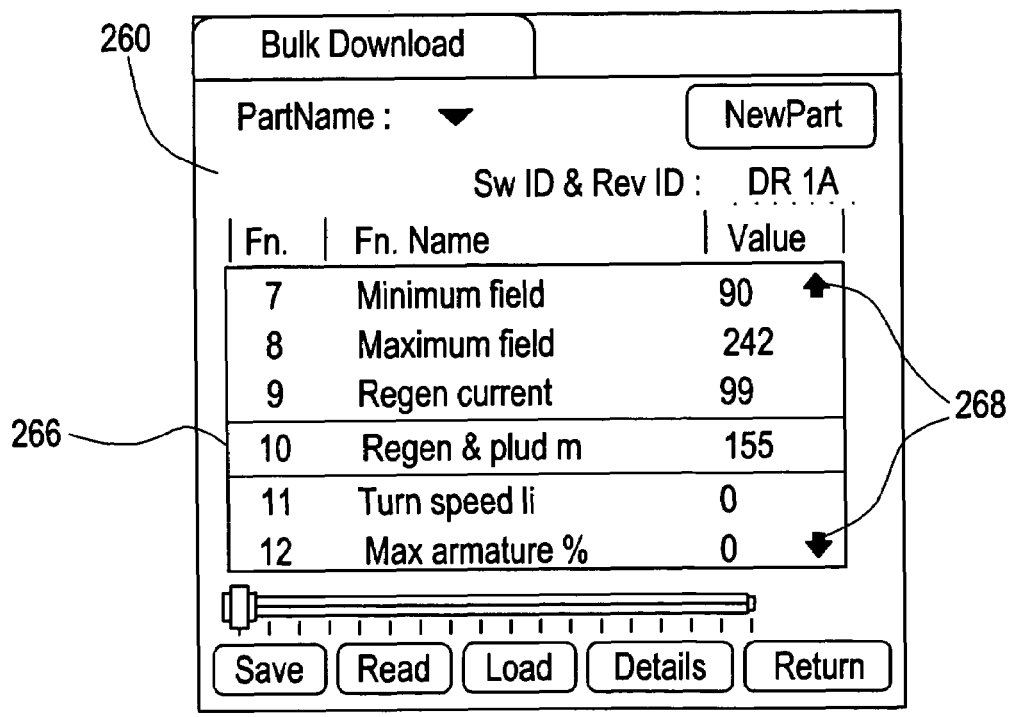
FIG. 20 shows a screen shot of an exemplary bulk download screen displaying the function settings.

A user may then scroll through the function setting list 266 shown in FIG. 20 and review the values for each function. To scroll through the list 266, the user may tap the up or down arrows 268, or use scroll buttons provided on the handheld device 20.

If the database with the software information is not installed on the handheld device 20, then there may be no description in the Function ("Fn") Name column 272 in the function setting list 266. As shown in FIG. 21, N/A (Not Available) may appear under Fn Name 272, however, the values 274 in the function locations may still be read. These settings in the setting list 266 may be changed, saved and reloaded, as described below.

For creating a new part name, once the control settings are downloaded, as described with respect to FIGS. 17-21, the user may save the control settings to a new part name than may be recalled, changed and reloaded. By selecting the save icon or button 282 from the bulk download screen 260, a "part information" screen 290 may appear as shown in FIG. 22 and ask for the part name by using the part name prompt 292 and providing a user entry spot 294 for entering the part name. The part name may be a certain number of characters, such as four, using either alpha or numeric characters. A done icon 296 may be selected for bringing up the bulk download screen 260 for displaying the saved file, as shown in FIG. 23. The new part number will then be appended to the list of part numbers already available in the database, for future reference.

Figure 25:
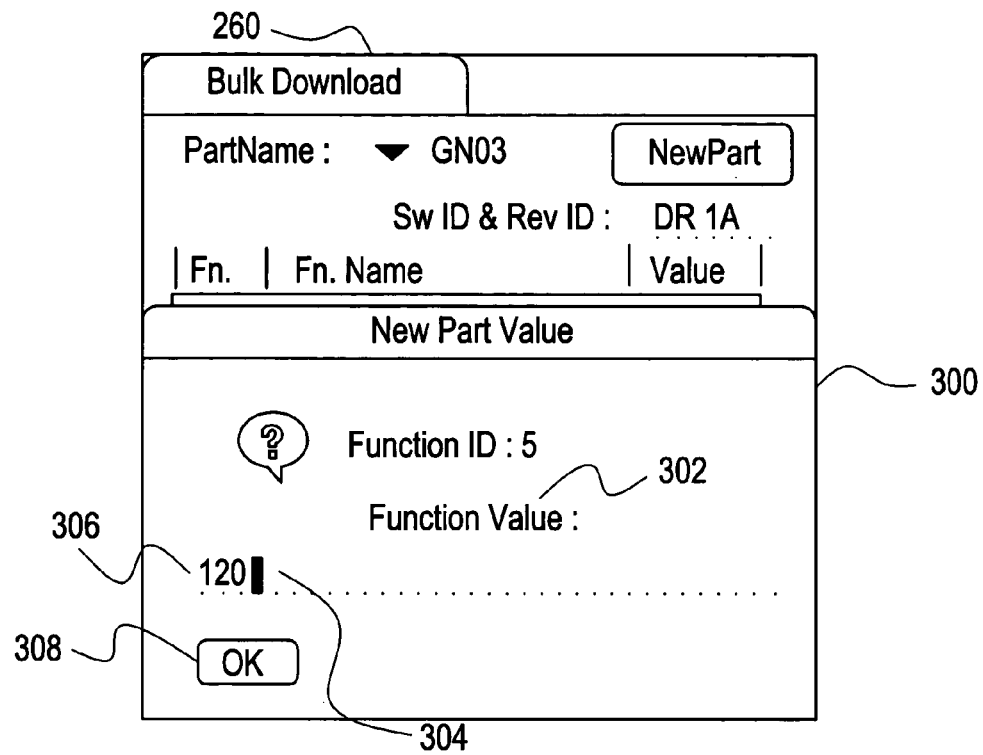
FIG. 25 shows a screen shot of an exemplary bulk download screen overlaid with a screen shot of an exemplary new part value screen requesting a new function value for a particular function number selected in FIG. 24.

As shown in FIG. 24, from a part name drop down menu 298, a name to be changed may be selected. Using a scroll button on the handheld 20 or the up and down arrows 268, the function to be changed may be highlighted and selected. To change the value, the details icon 286 may be selected for bringing up the new part value screen 300 as shown in FIG. 25. The screen 300 may display a function value prompt 302 and the desired value 306 can be entered in the function value data entry location 304 and confirmed with a tap of the OK button 308.

Figure 26:
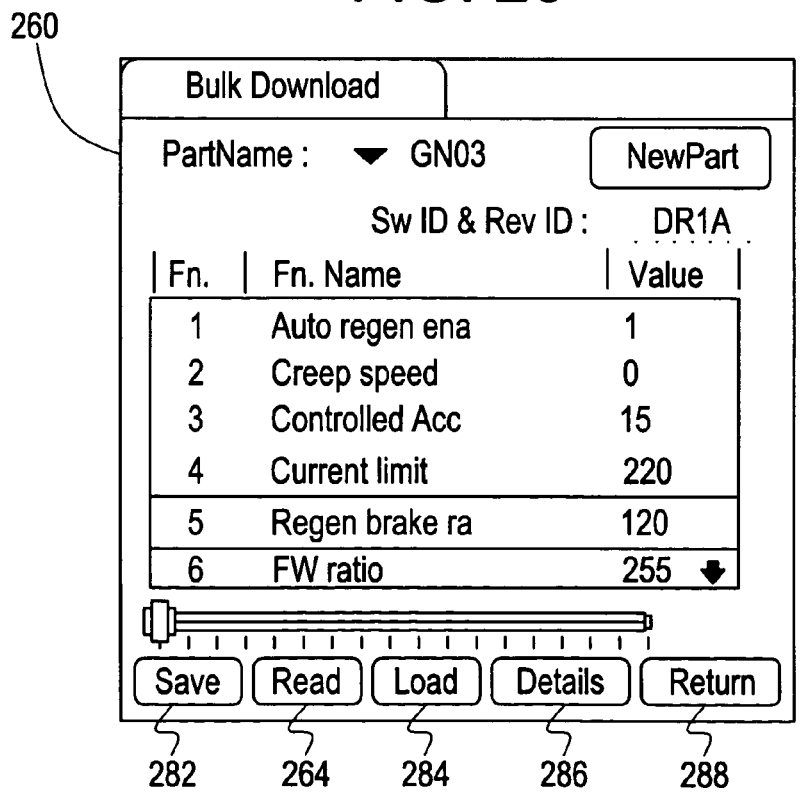
FIG. 26 shows a screen shot of an exemplary bulk download screen reflecting the new function value edited in FIG. 25.
Figure 27:
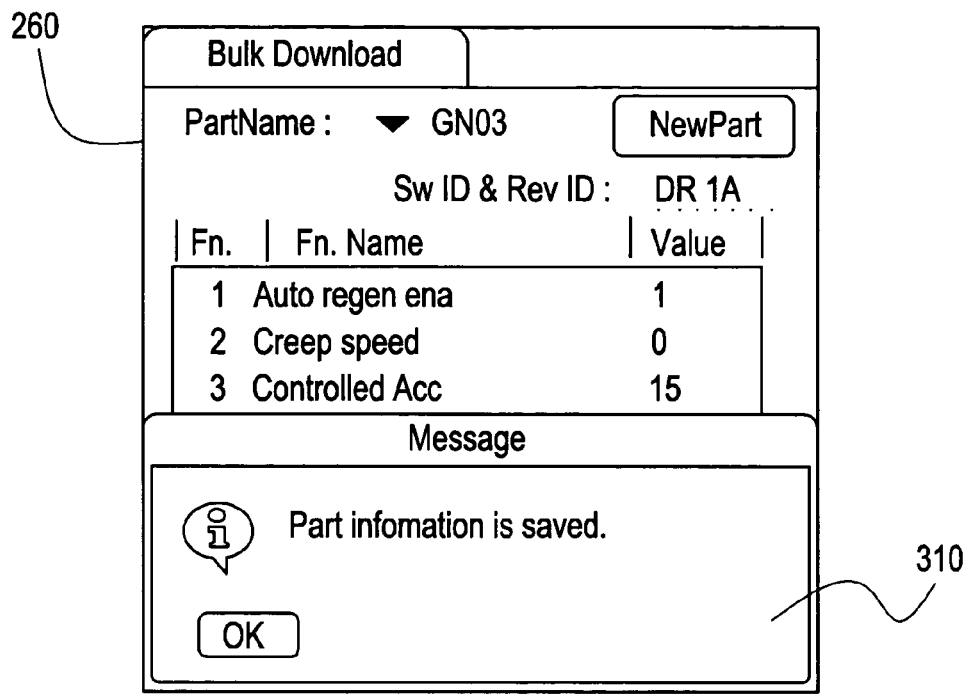
FIG. 27 shows a screen shot of an exemplary bulk download screen overlaid with a message indicating a successful save of part information.

Once all of the desired or required value changes have been made, the save icon 282 as shown in FIG. 26 may be selected to save the update part information for future use. It may be noted that the value of function ID 5 has been changed from a value of 110 in FIG. 24, to a value of 120 in FIG. 26, through the new part value screen 300 shown in FIG. 25. As shown in FIG. 27, a confirmation message 310 may be displayed to confirm that the part information is saved.

Figure 28:
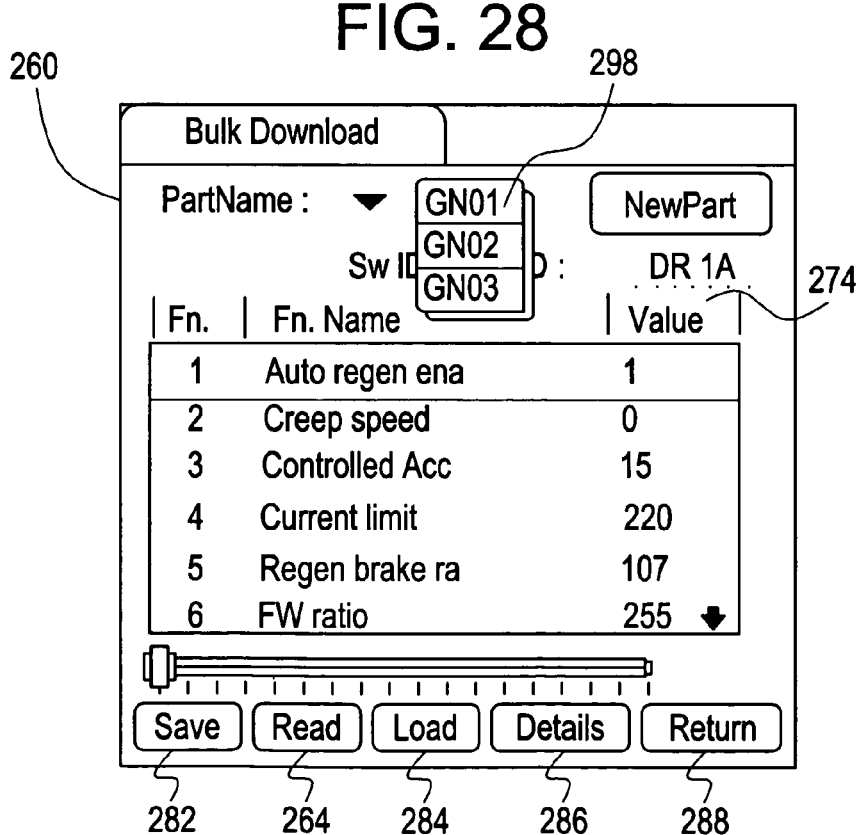
FIG. 28 shows a screen shot of an exemplary bulk download screen showing a pull down menu for selecting a new part.
Figure 29:
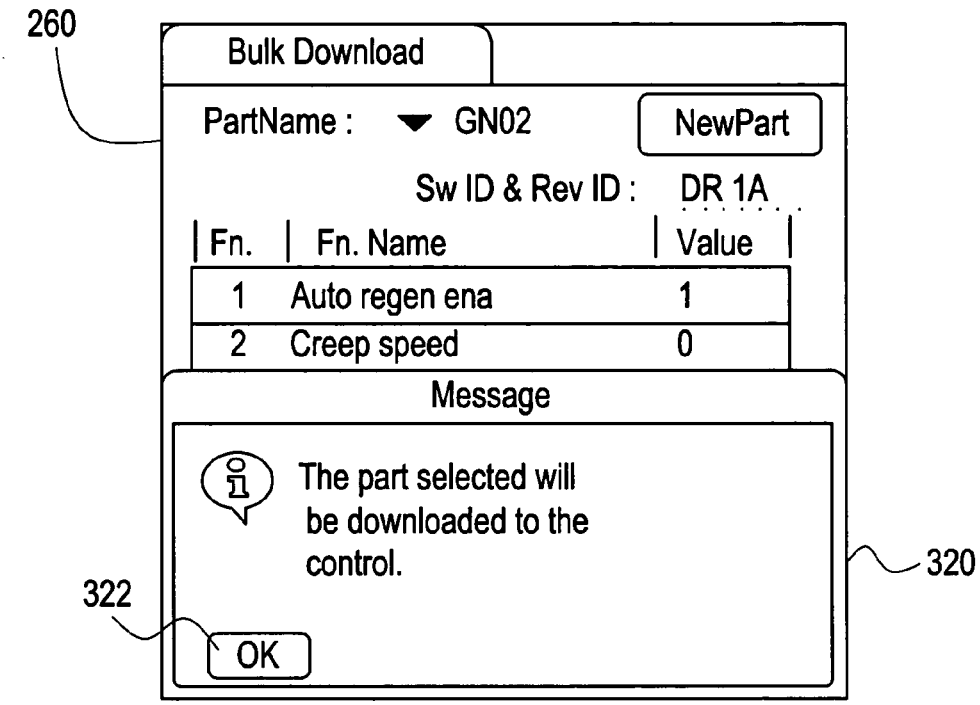
FIG. 29 shows a screen shot of an exemplary bulk download screen overlaid with an exemplary message confirming that the selected part will be downloaded to the control.

The setting values 274 included in any particular file may be modified prior to downloading them into the control 12. The Part Name drop down menu 298 may be selected to list available files as shown in FIG. 28. Once the desired file is selected, the load icon 284 may be tapped or selected. As shown in FIG. 29, a download message screen 320 may appear and the OK button 322 may be selected for continuing the download.

Figure 30:
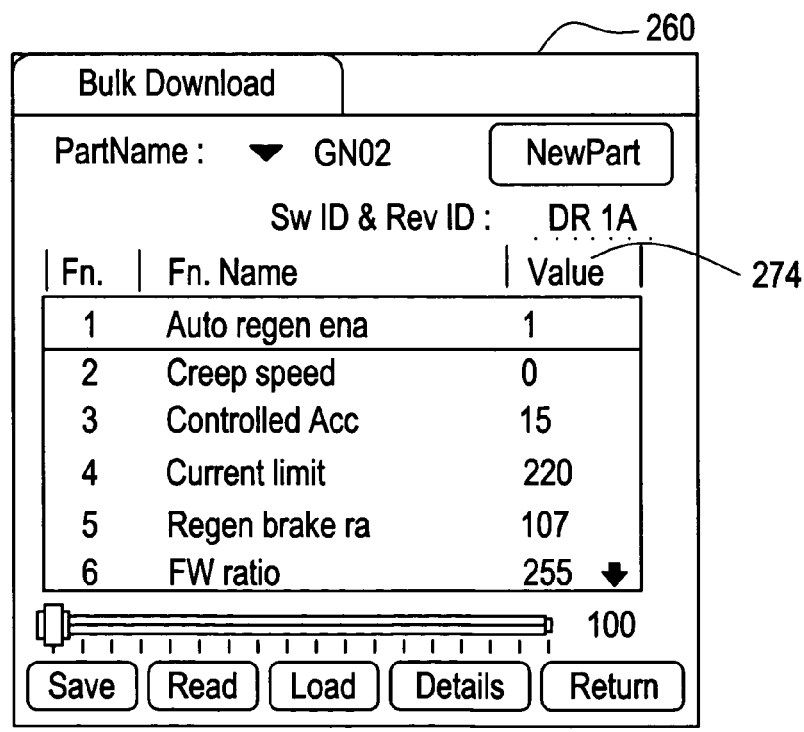
FIG. 30 shows a screen shot of an exemplary bulk download screen showing the values for the newly selected part.
Figure 31:
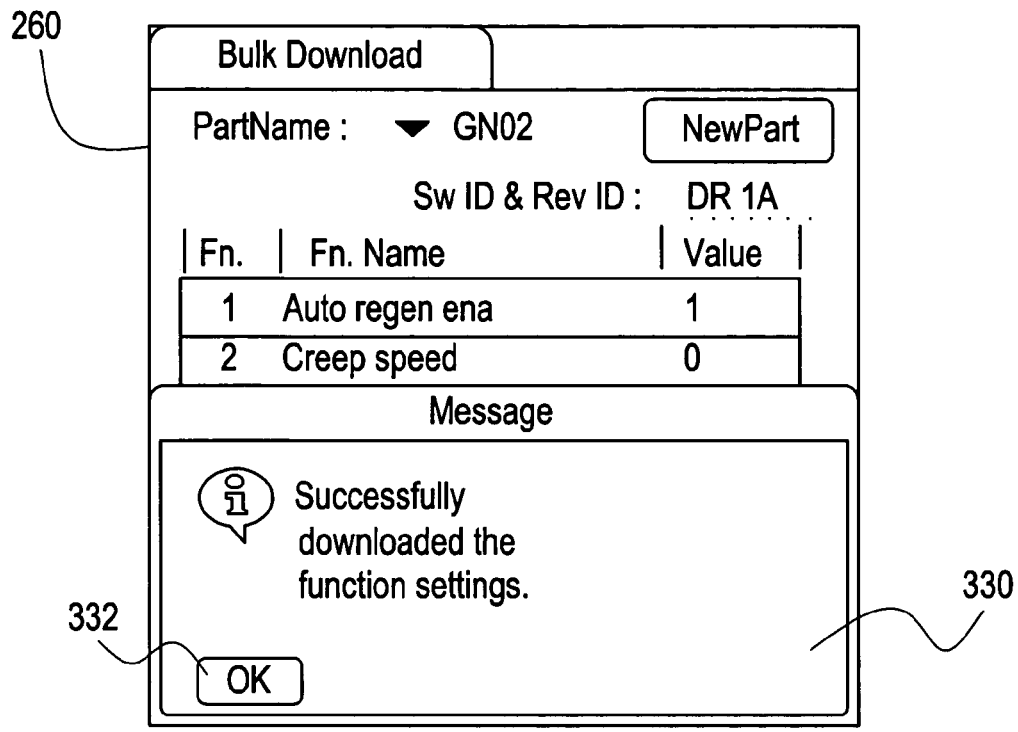
FIG. 31 shows a screen shot of an exemplary bulk download screen overlaid with an exemplary message confirming successful download of the function settings.
Figure 32:
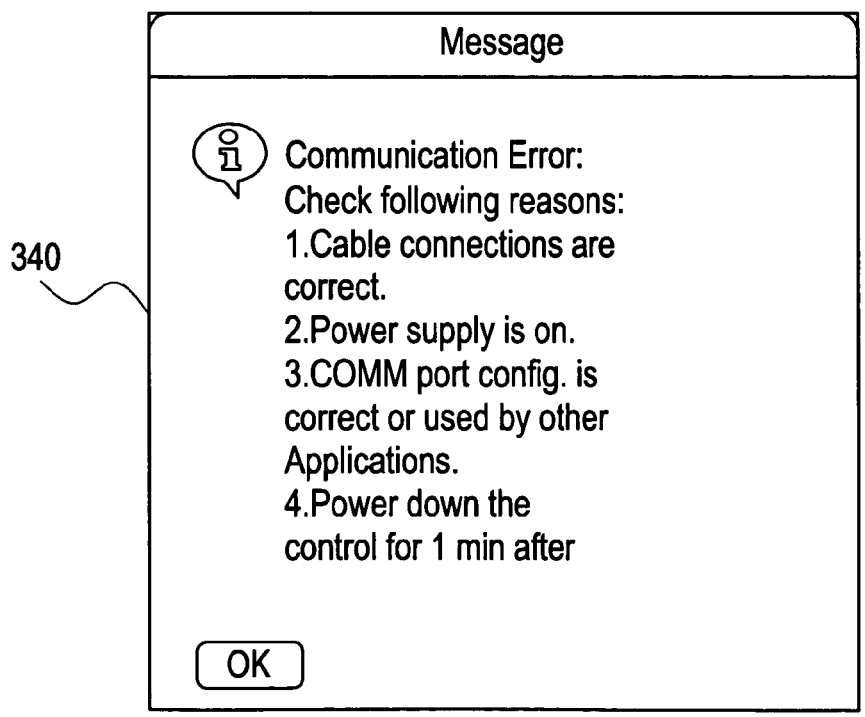
FIG. 32 shows a screen shot of an exemplary error message.

Turning now to FIG. 30, values 274 for part name may be loaded into the control 12 and a successfully loaded message screen 330, such as shown in FIG. 31 may appear once the download is complete. An OK button 332 may be tapped for continuing. If there is a communication error during the download, a communication error message screen 340 may appear. The communication error message screen 340 may include suggestions on how to correct the problem.

By selecting a "Read/Write Function" option 254 on the main menu screen 250, the user can read a single EEPROM value in a control or modify a single value, without the need to read or download all of the function locations.

Figure 33:
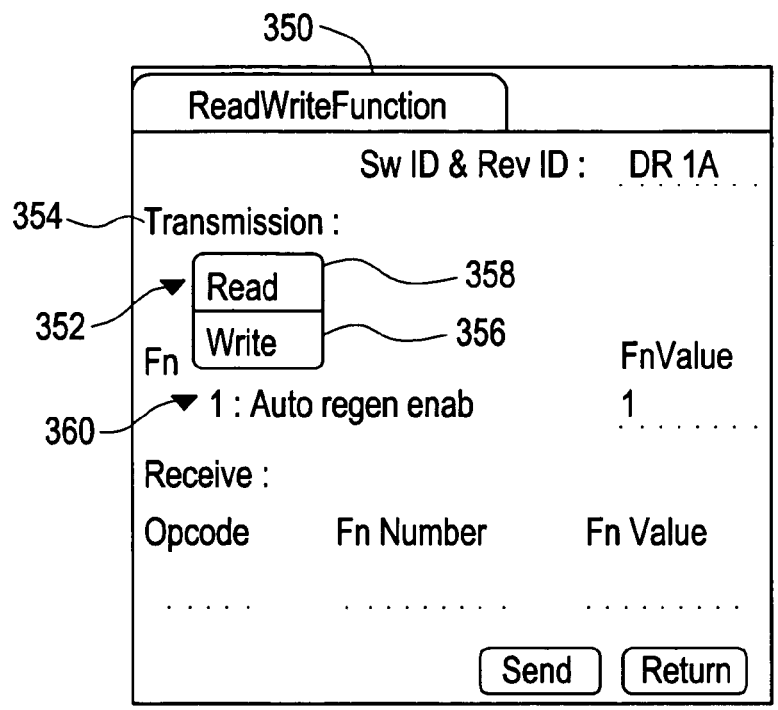
FIG. 33 shows a screen shot of an exemplary readwrite function screen and a pull down menu for selecting transmission mode.
Figure 34:
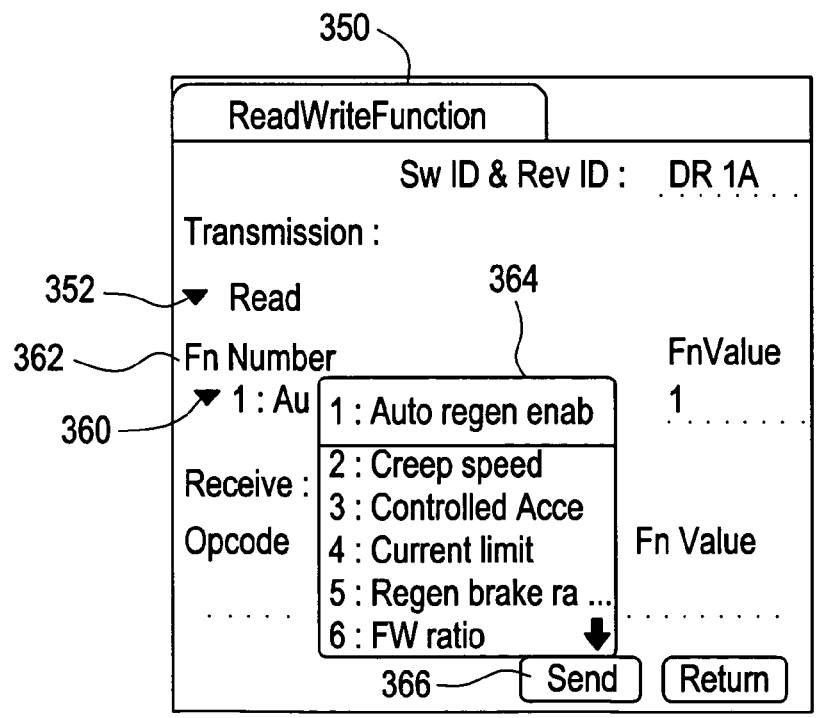
FIG. 34 shows a screen shot of an exemplary readwrite function screen and a pull down menu for selecting a function number.
Figure 35:
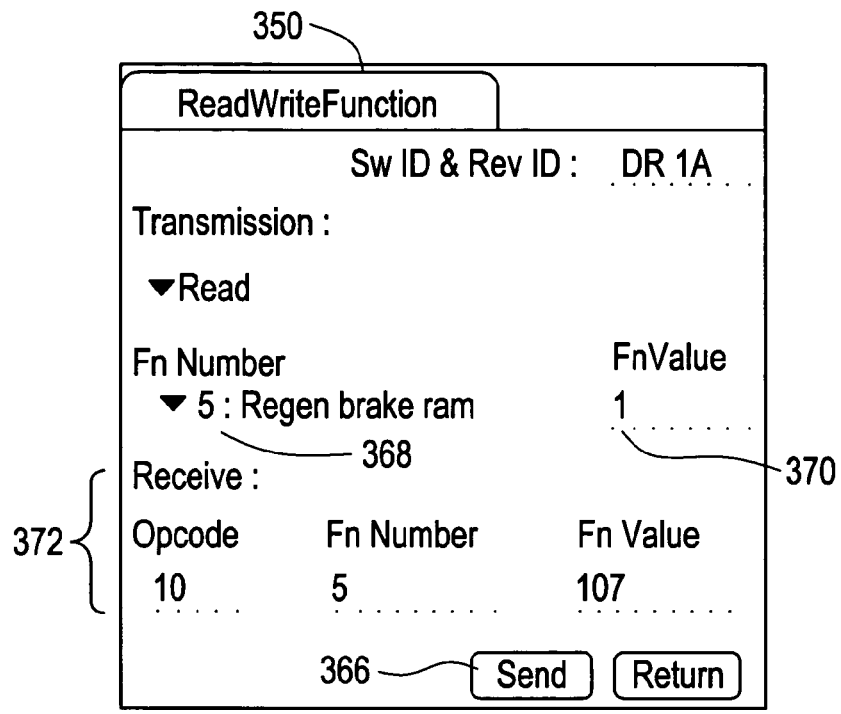
FIG. 35 shows a screen shot of an exemplary readwrite function screen displaying received data on the selected function number.

When the Read Write Function icon 254 is selected, a Read Write Function screen 350 may appear as shown in FIG. 33. By tapping or otherwise selecting an arrow 352 under "Transmission" 354, a "Read/Write" drop down menu 356 may appear. Then, the Read button, icon, or choice 358 may be selected. The OEM instruction manual may include a control software memory map which may identify specific E2 locations. As shown in FIG. 34, by selecting an arrow 360 under Fn Number 362, the Function Number drop down menu 364 appears. The function number that the user wants to read may be found by scrolling through the menu 364 and then selected. As shown in FIG. 35, by tapping a send icon 366, the Function number 368 and Function value 370 may be read from the control 12 and displayed on the Receive section 372 of the screen 350.

Figure 36:
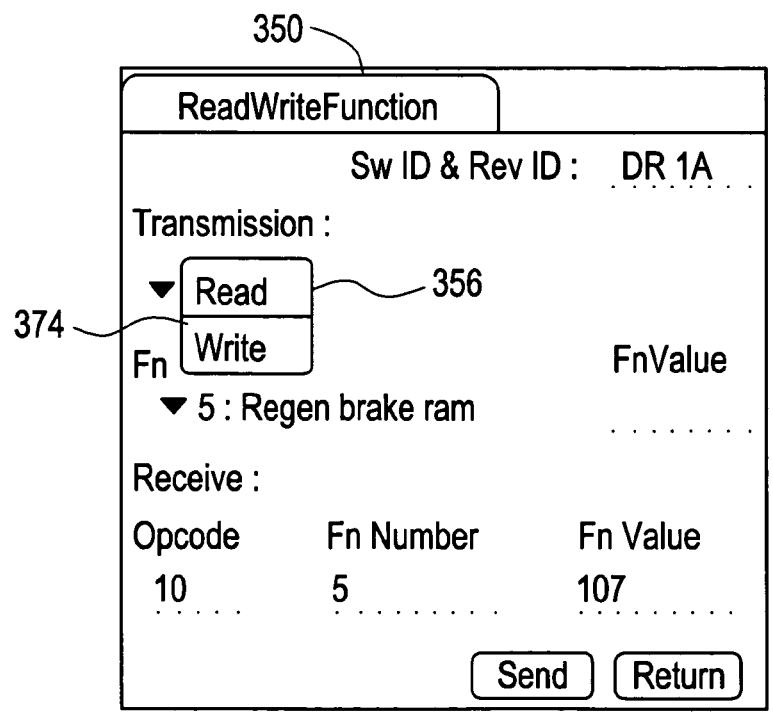
FIG. 36 shows a screen shot of an exemplary readwrite function screen with write selected from the pull down menu of transmission mode options.
Figure 37:
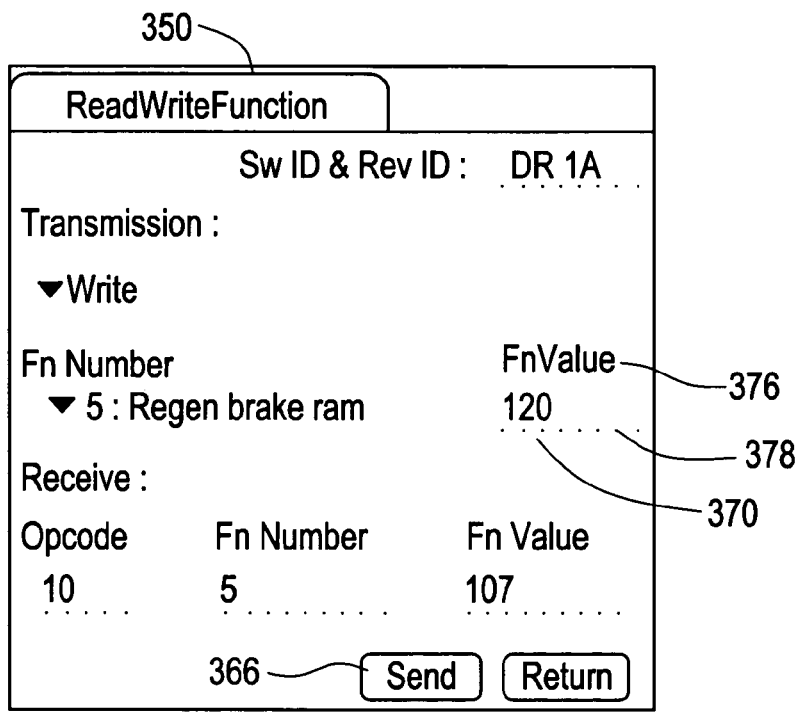
FIG. 37 shows a screen shot of an exemplary readwrite function screen with an edit being made to the function value of a selected function number.
Figure 38:
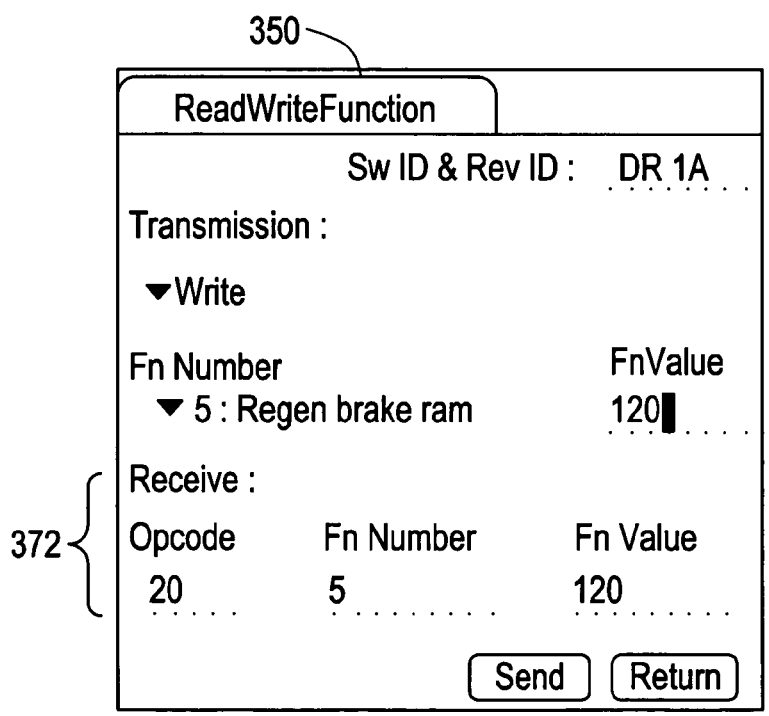
FIG. 38 shows a screen shot of an exemplary readwrite function screen displaying the change in the receive portion of the screen after the edit is sent.

Turning now to FIG. 36, to write to a certain location, a Write option 374 may be selected from the drop down menu 356. The function number that is to be changed from the drop down menu 364 under Fn Number may be specified as shown in FIG. 34. As shown in FIG. 37, the user may then add the new function value 376 to the blank 378 under Fn Value 370. The Send icon 366 may then be selected and the function value may be changed in the control 12 and read back to the Receive section 372 to verify the change, as shown in FIG. 38.

Figure 39:
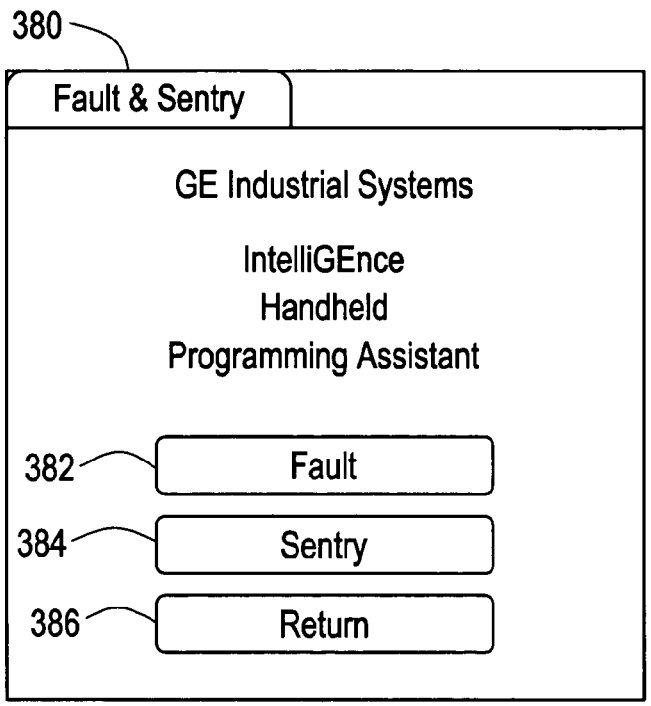
FIG. 39 shows a screen shot of an exemplary fault and sentry screen displaying menu options for fault, sentry, and return.

To use the software 10 to display the last sixteen stored fault codes from a control 12, the "Fault & Sentry" option 244 may be selected from the main menu screen 240 shown in FIG. 15. In one embodiment of the control 12, sixteen stored faults are saved in the EEPROM area 16 of the control and hence only sixteen such latest faults are stored in the form of a queue (the latest faults may then be stored at the cost of earlier occurring faults). However, as the situation demands and as the EEPROM 16 memory resources change, the number of stored faults may change, and therefore it should be understood that an EEPROM 16 having sixteen stored fault codes is exemplary and alternate numbers of stored fault codes would be within the scope of this invention. A Fault & Sentry main screen 380 may appear as shown in FIG. 39 which may include button options for fault 382, sentry 384, and return 386.

Figure 40:
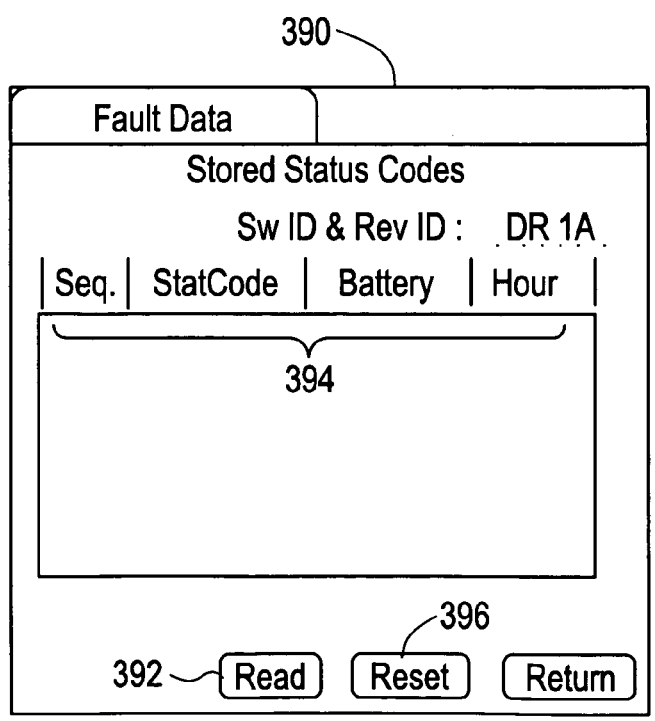
FIG. 40 shows a screen shot of an exemplary fault data screen prior to reading of the codes from the control.
Figure 41:
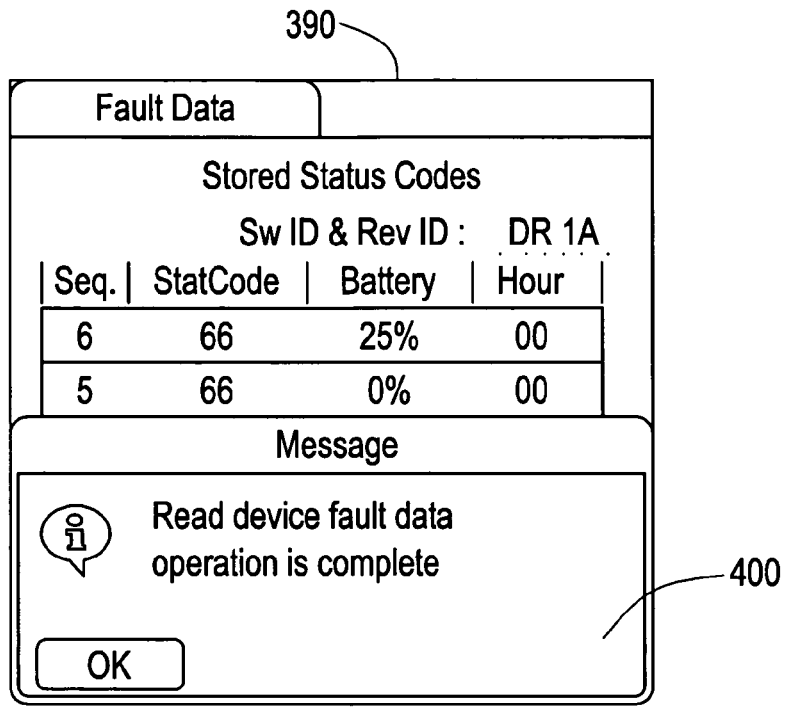
FIG. 41 shows a screen shot of an exemplary fault data screen overlaid with an exemplary message confirming that the read fault data operation is complete.
Figure 42:
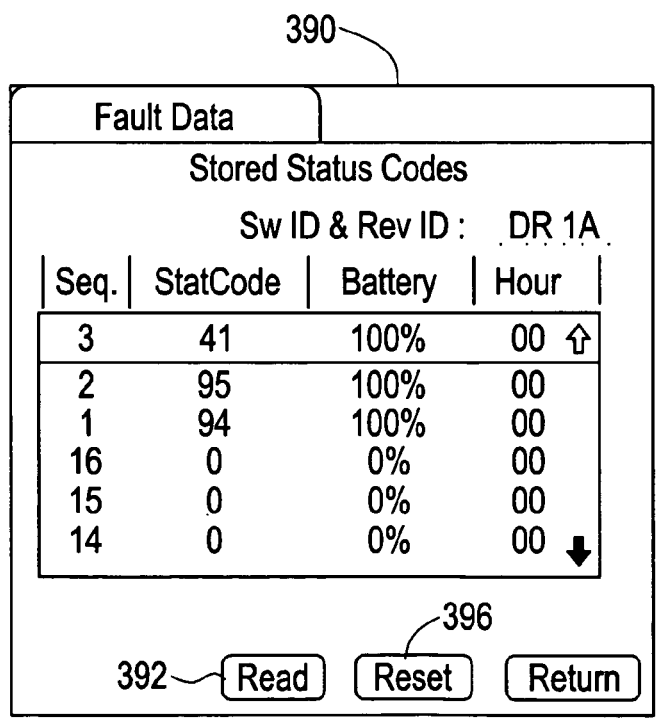
FIG. 42 shows a screen shot of an exemplary fault data screen containing the fault data.
Figure 43:
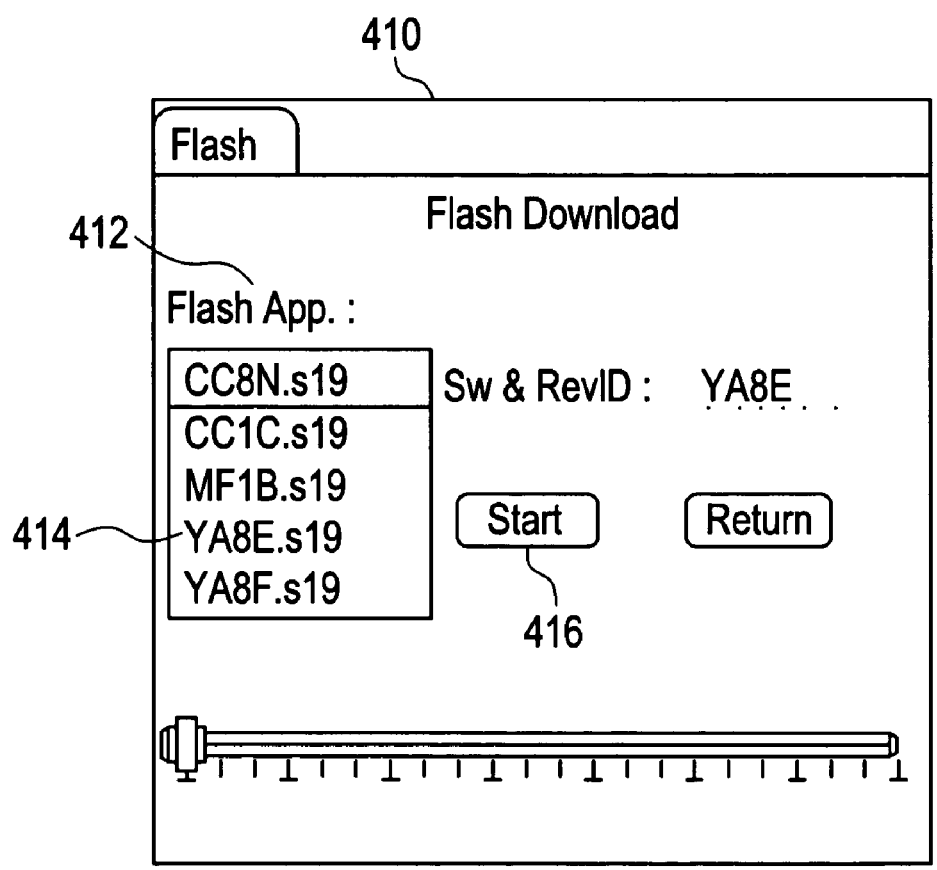
FIG. 43 shows a screen shot of an exemplary flash download screen displaying a pull down menu for selecting a flash application.

When the fault button 382 is tapped, a fault data screen 390 may be displayed as shown in FIG. 40. The "Read" button 392 may be tapped and the data read from the control 12 may fill the fields 394 with the data as shown in FIG. 42. The program may confirm when the reading of data from the control 12 is complete by displaying a confirmation message screen 400 as shown in FIG. 41. By selecting the "Reset" button 396, the stored fault codes will be cleared in the control 12 to which the handheld 20 is connected. The program or software 10 may need to logon to the next unit prior to reading data from a subsequent unit, after the RS-232 connection is moved to the next control, so the "Fault" option 382 may be selected again to repeat the process.

Flash memory locations 17 within the controller unit or control 12 may permit the rewriting or upgrading of software after the initial programming at the factory. All controls 12 may not be provided with flash memory, and the user should refer to the vehicle OEM to confirm that the selected control 12 contains flash memory.

When a user selects the "Flash Download" option 246 on the main menu screen 240 shown in FIG. 15, a Flash screen 410 may be displayed. A prompt 412 may ask the user to identify the Flash application, such as files with the .s19 extension listed in menu 414, intended to be loaded into the control 12. The .s19 file extension may denote those files containing executable software that may be loaded into controls 12 with flash-compatible microprocessors 18. The vehicle key switch may need to be in the "off" position, prior to any attempts to complete a flash download of software.

Figure 44:
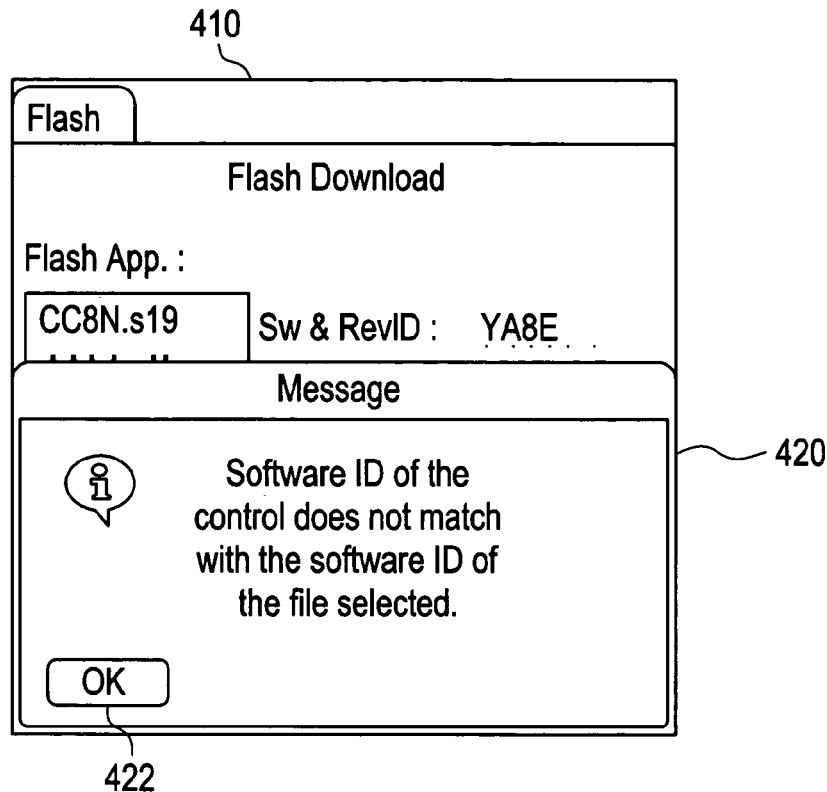
FIG. 44 shows a screen shot of an exemplary flash download screen overlaid with an exemplary message that the software IDs of the control and the selected flash application file do not match.

After the desired .s19 file under the Flash App prompt 412 is selected, the Start button 416 may be selected. The program may then compare the software ID of the software already installed in the control 12 with the software ID of the file that has been selected for download. When the Start button 416 is tapped, the user may then receive a message, as shown in message screen 420 noting that the two ID's did not match as shown in FIG. 44. If the software ID's match, the user may receive a message stating that the flash software will start to download. The software ID's may only match when the user has selected the same software for download that already exists in the control 12. If the user has selected a later version of appropriate software for download, they may still be advised that the software ID's did not match. When the user selects the OK button 422 in acknowledgement that the two software ID's have been compared, the program checks the compatibility of the new software selected for download with the control type for which it is intended. The program may be configured to prevent a user from inadvertently loading an incorrect type of software into the control. If the program determines that the user has selected a new version of software that is not of the same type as that which is already installed in the control, a warning message may be displayed as shown in FIG. 44, forcing the user to select another .s19 file for download from the menu 414. The program may repeat the process of comparing the software ID's until an appropriate version of new software is selected for the control 12.

Figure 45:
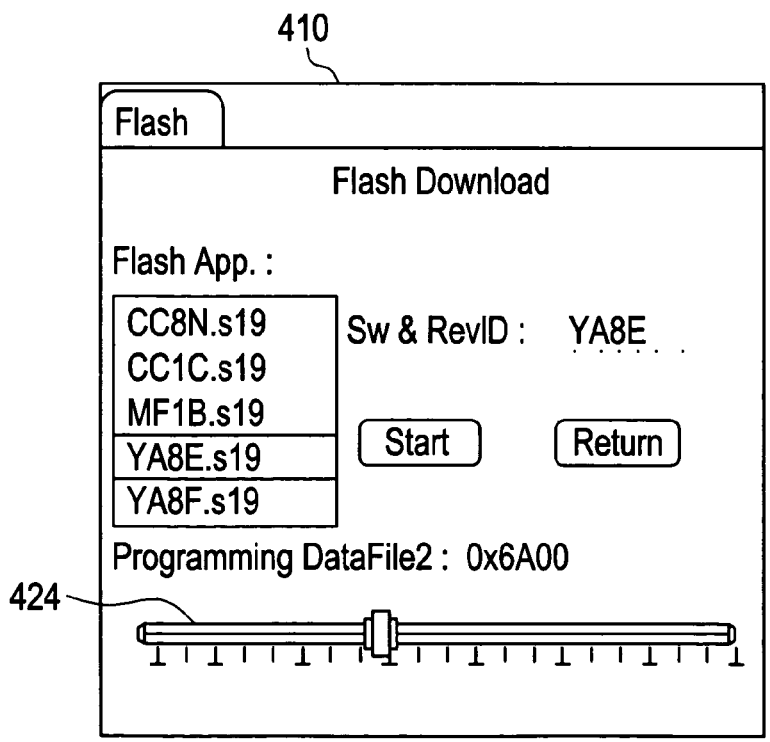
FIG. 45 shows a screen shot of an exemplary flash download screen with the download in progress.
Figure 46:
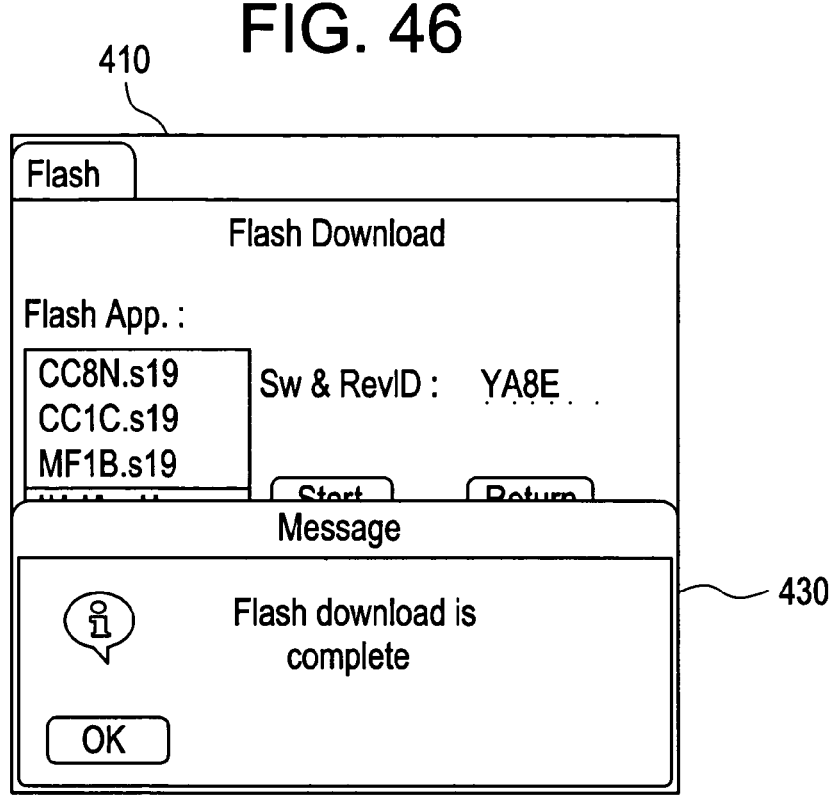
FIG. 46 shows a screen shot of an exemplary flash download screen overlaid with an exemplary message that the flash download is complete.
Figure 47:
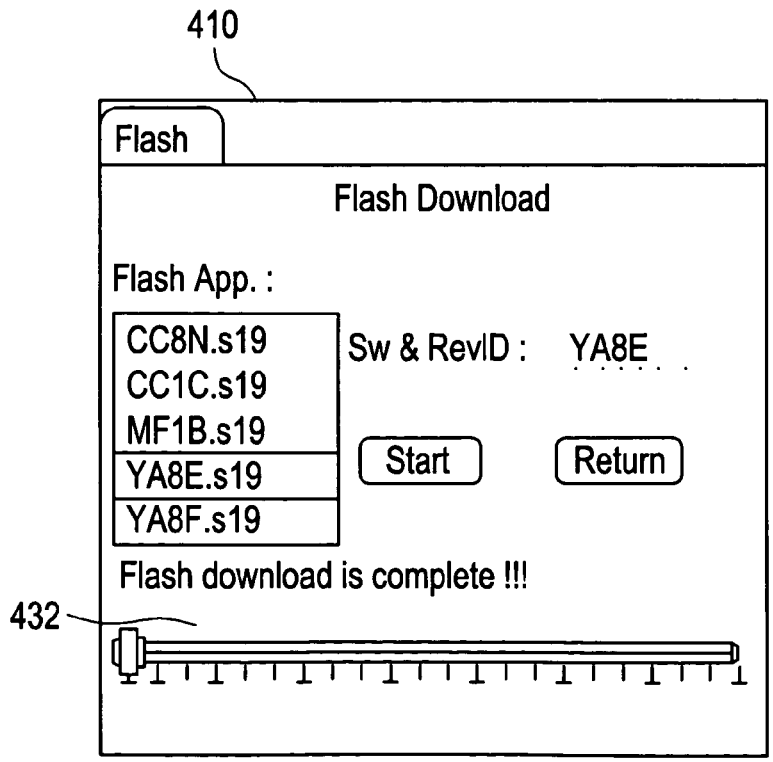
FIG. 47 shows a screen shot of an exemplary flash download screen stating that the flash download is complete within the screen.

When the user selects an appropriate version of software for download into his or her control 12, the program may display a progress tracker 424 shown in FIG. 45 allowing the user to track the progress of the download. When the download is complete, the user may see a confirmation message screen 430 indicating that the download is complete as shown in FIG. 46. Alternatively, or additionally, the screen 410 may include a confirmation message 432 conveying to the user that the flash download is complete as shown in FIG. 47.

If the user attempts to flash load new software into a control 12 that does not contain a flash-compatible microprocessor 18, the program may be unable to communicate with the control 12, and the user may receive an error message. The user may then refer to vehicle OEM for advice regarding upgrades or changes to software for the control 12 in question.

Figure 48:
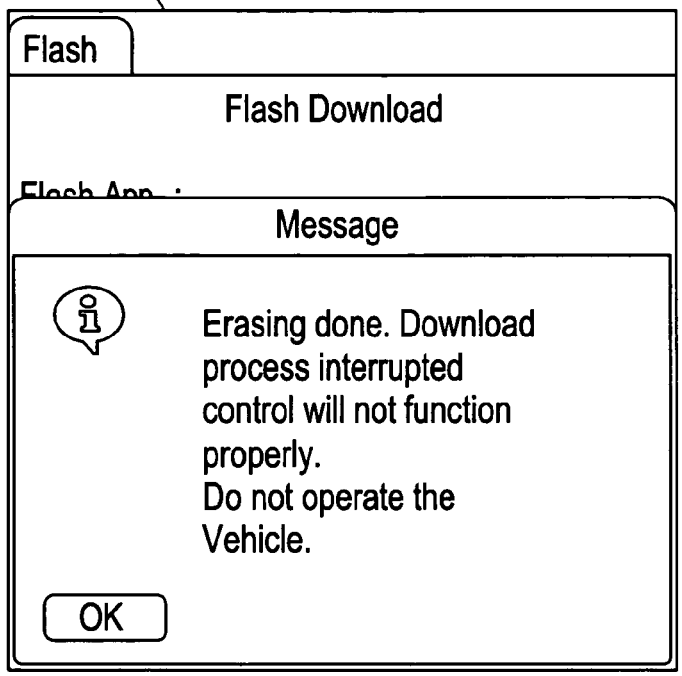
FIG. 48 shows a screen shot of an exemplary flash download screen overlaid with an exemplary error message.
Figure 49:
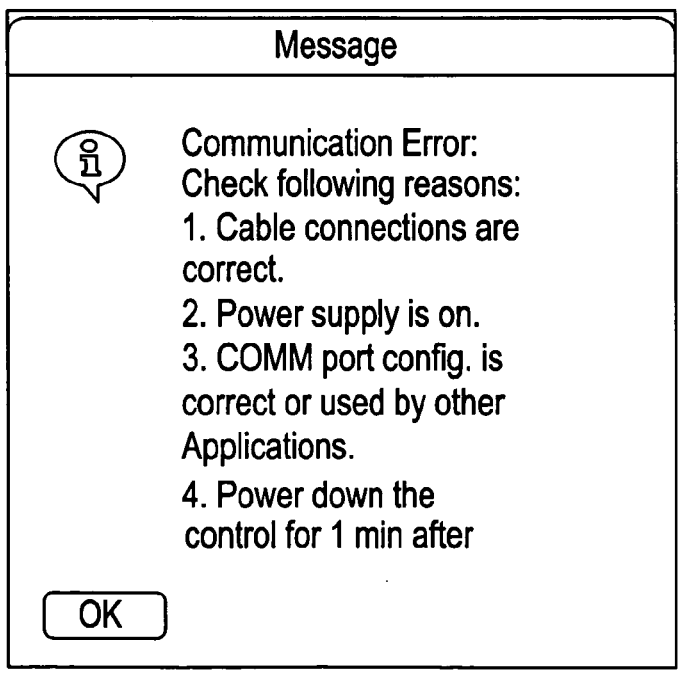
FIG. 49 shows a screen shot of an exemplary error message.
Figure 50:
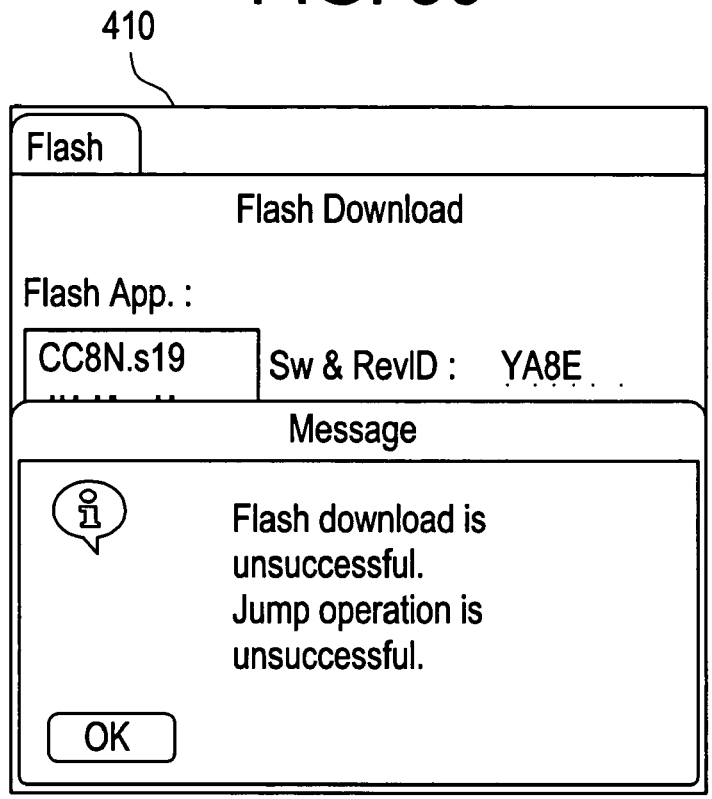
FIG. 50 shows a screen shot of an exemplary flash download screen overlaid with an exemplary error message.

If, for any reason, the flash download of software is interrupted and cannot be completed, the user may see a sequence of exemplary error messages as shown in FIGS. 48-50. The user may verify that all connections, including the RS-232 connection 22 with the control 12, are in place, and the vehicle key switch is in the "off" position. Then, the user may repeat the flash download process, prior to any attempt to resume operation of the vehicle 14. If the second attempt to flash download software is successful, the user may receive a confirmation on the screen such as shown in FIG. 46. However, if the interruption of the flash download damaged the application code resident in the control 12, depending on the point where the download was interrupted, the second attempt to complete a flash download will also be unsuccessful, and the user will again see the error messages.

Figure 51:
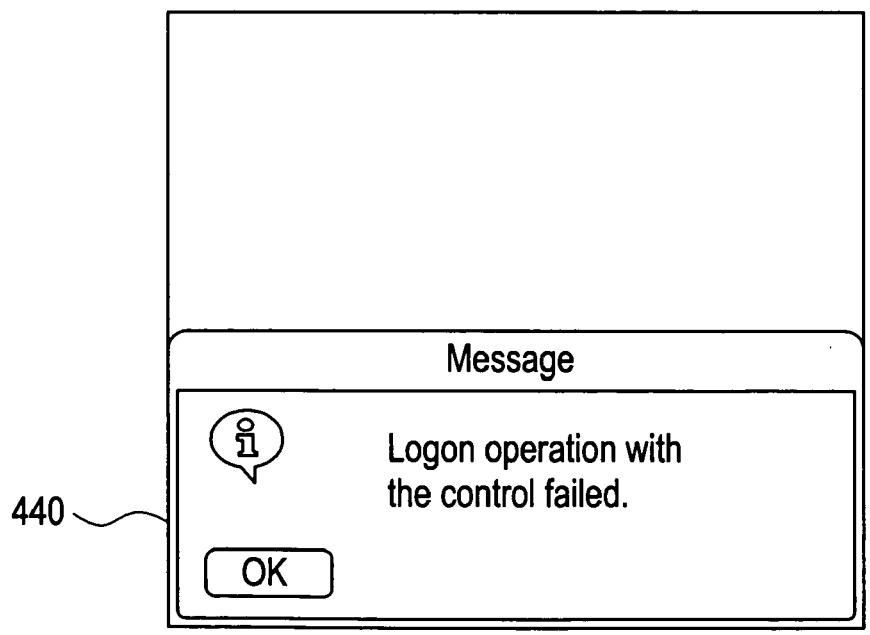
FIG. 51 shows a screen shot of an exemplary error message when logon operation with the control fails.

As shown in FIG. 51, if the user receives a "failed logon" error message 440, it may indicate that the control application code has been damaged. The control 12 may be repaired by an authorized control service center and the user may refer to the OEM for guidance regarding the repair of the control 12.

Figure 52:
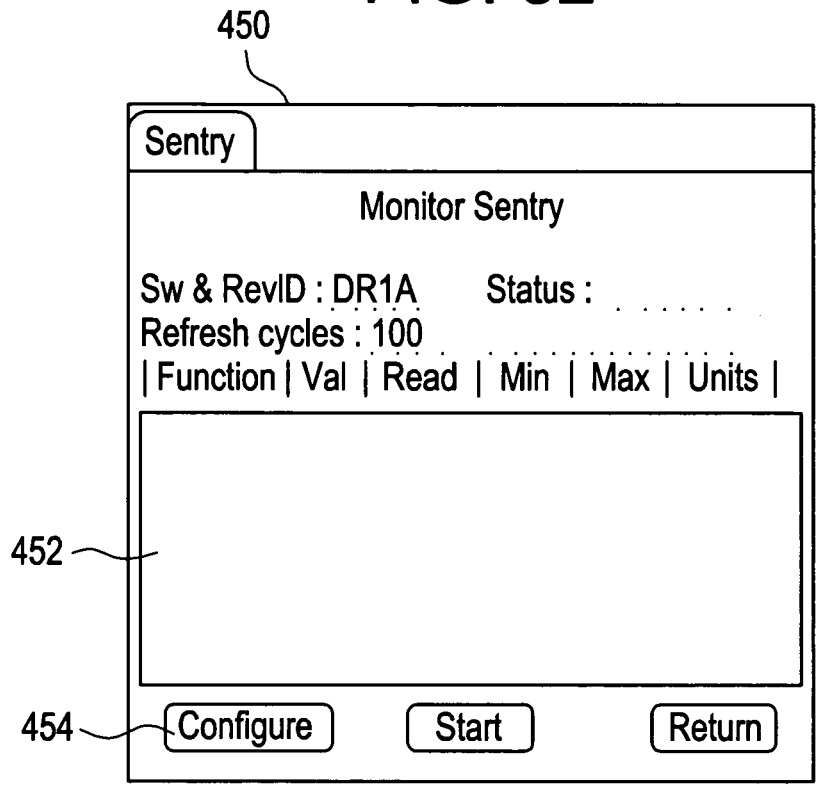
FIG. 52 shows a screen shot of an exemplary monitor sentry screen prior to a monitoring operation.
Figure 53:
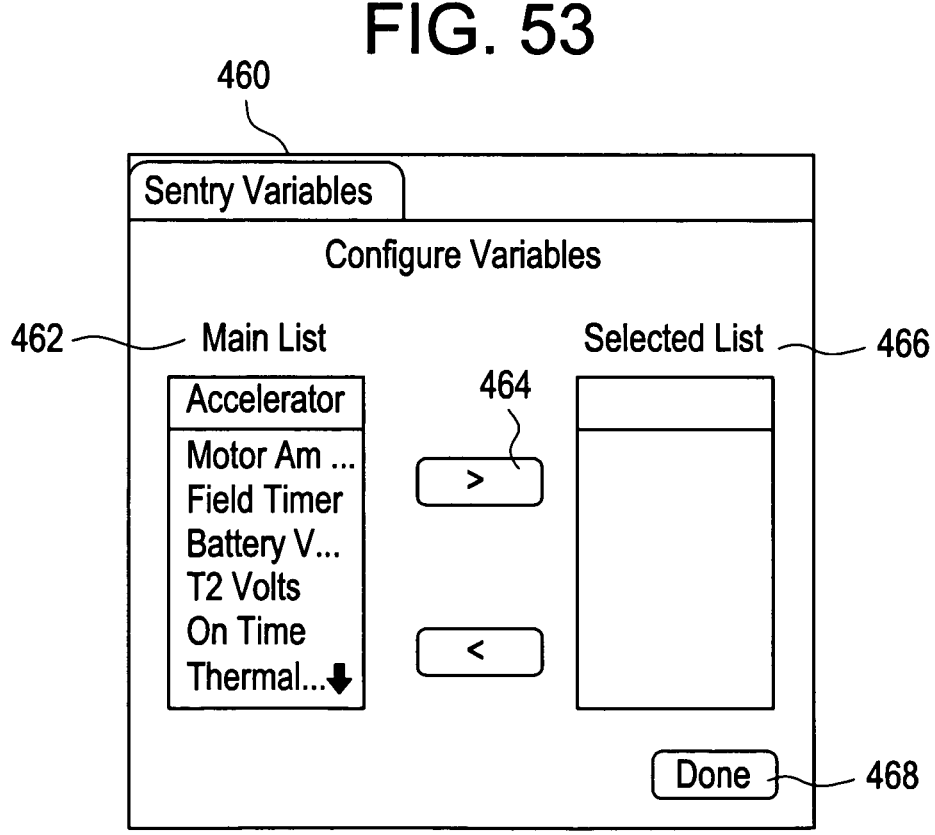
FIG. 53 shows a screen shot of an exemplary sentry variables screen prior to selecting items from a main list.
Figure 54:
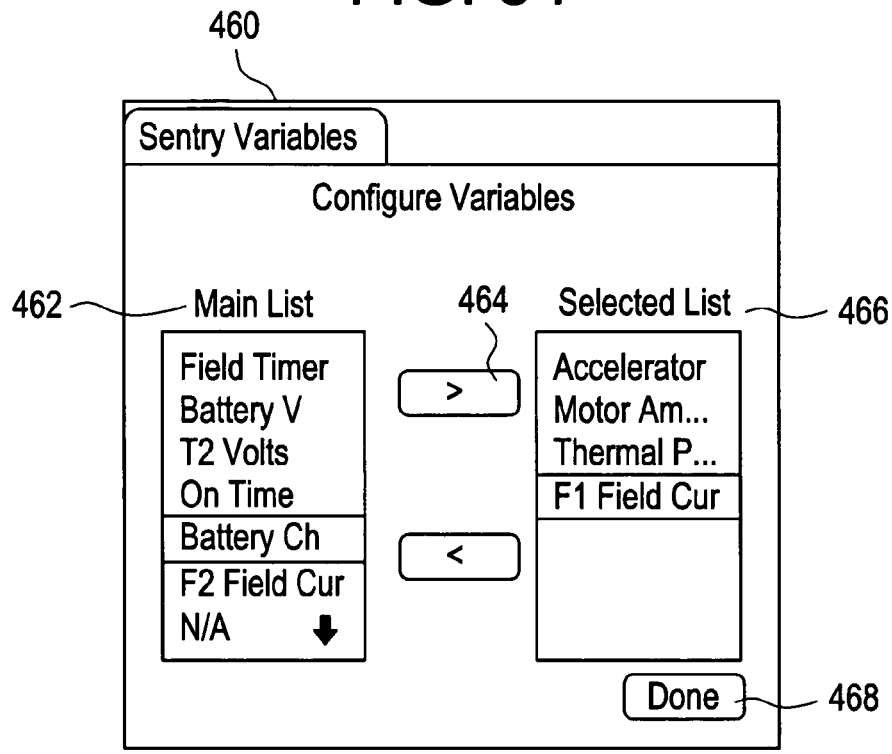
FIG. 54 shows a screen shot of an exemplary sentry variables screen with a list of selections chosen from the main list.

Prior to selecting the "Sentry" option 384 as shown in FIG. 39, the user may need to verify that the vehicle has the battery plugged in and the key switch is set to the "off" position. After selecting the "Sentry" option of the Fault & Sentry menu 380, a Sentry screen 450 such as shown in FIG. 52 may appear. Initially, all values in the field 452 may be blank. When the configure button 454 at the bottom of the screen 450 is selected, the user may be directed to the Configure Variables screen 460, such as shown in FIG. 53. From the main list 462 of variables, a number of variables, such as, by way of example only, up to seven, may be selected to be displayed by highlighting the variable and selecting a right arrow icon 464. The selected variable may appear in the selected list 466 as shown in FIG. 54. When all the desired variables are selected, the Done button 468 in the configure variables screen 460 may be selected.

Figure 55:
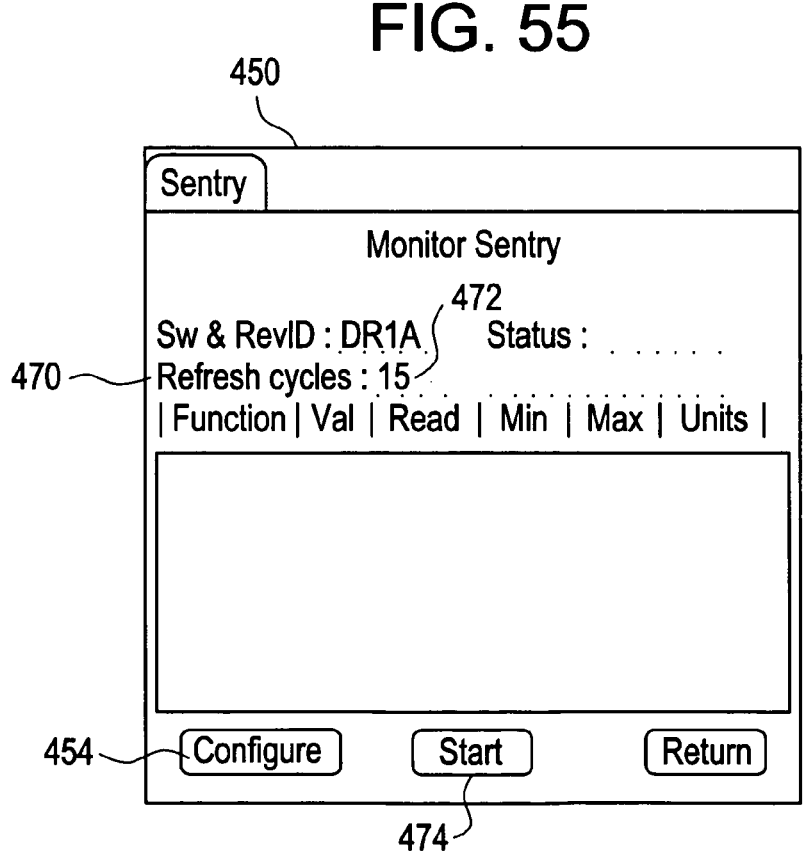
FIG. 55 shows a screen shot of an exemplary monitor sentry screen displaying the entry of a selected number of refresh cycles.
Figure 56:
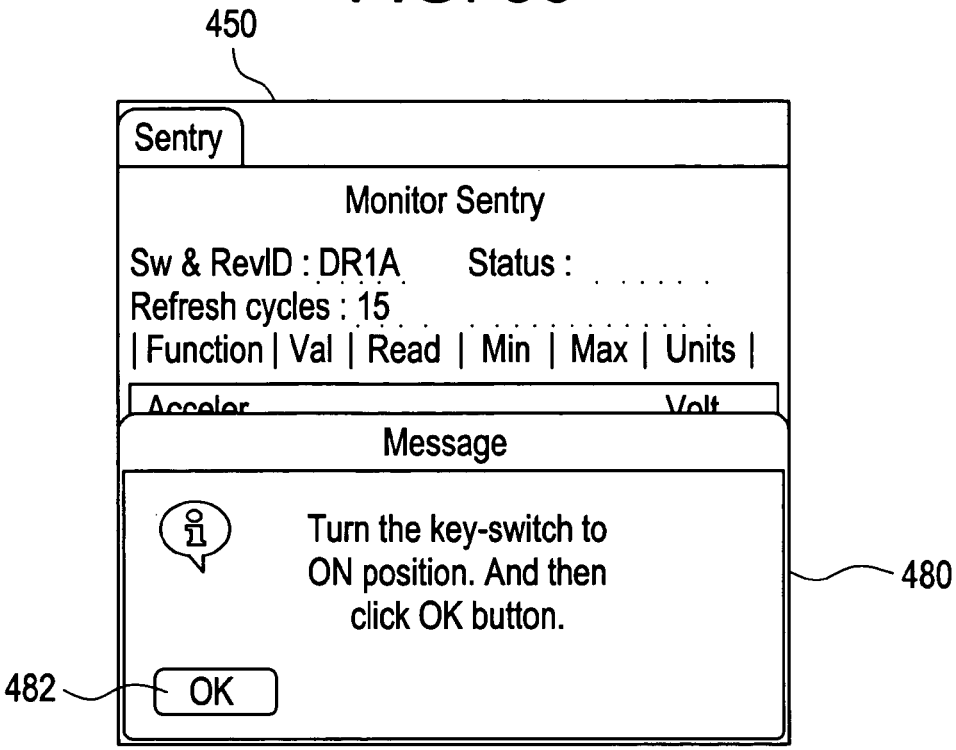
FIG. 56 shows a screen shot of an exemplary monitor sentry screen overlaid with an exemplary message to the user.

As shown in FIG. 55, before starting the monitor, the user may insert the number 472 of refresh cycles required at the refresh cycles prompt 470. Refresh cycles are the length of time that the monitor will continue to update monitored data. Each cycle may be equal to one second. Once the number of Refresh cycles are entered, the Start button 474 may be selected. As shown in FIG. 56, the user may then be directed to turn the key switch to the "on" position at a key switch prompt message screen 480.

Figure 57:
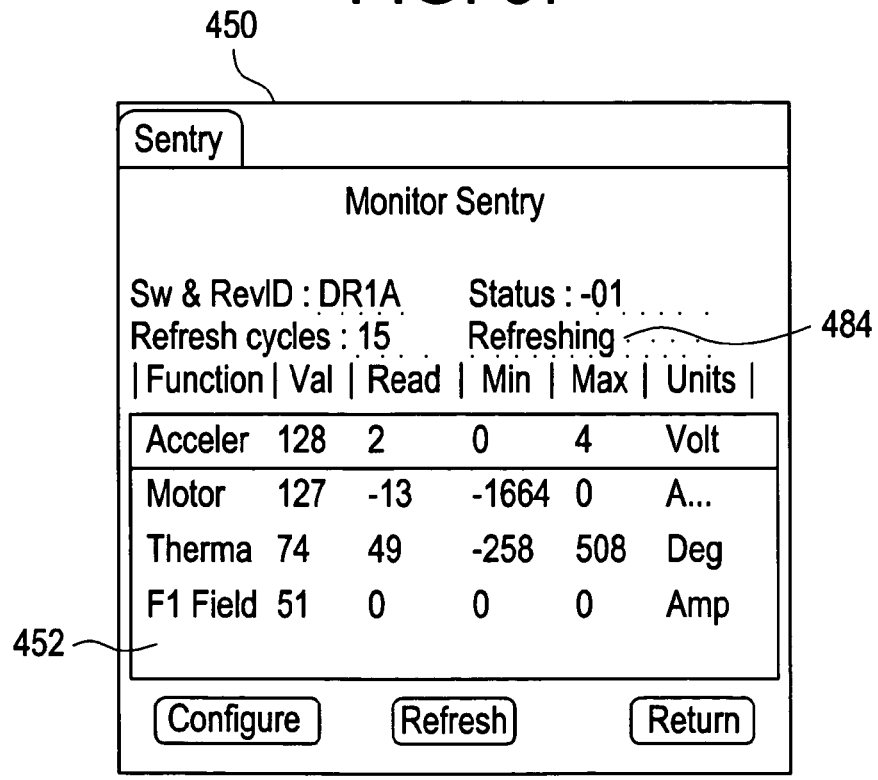
FIG. 57 shows a screen shot of an exemplary monitor sentry screen listing monitored data while refreshing.
Figure 58:
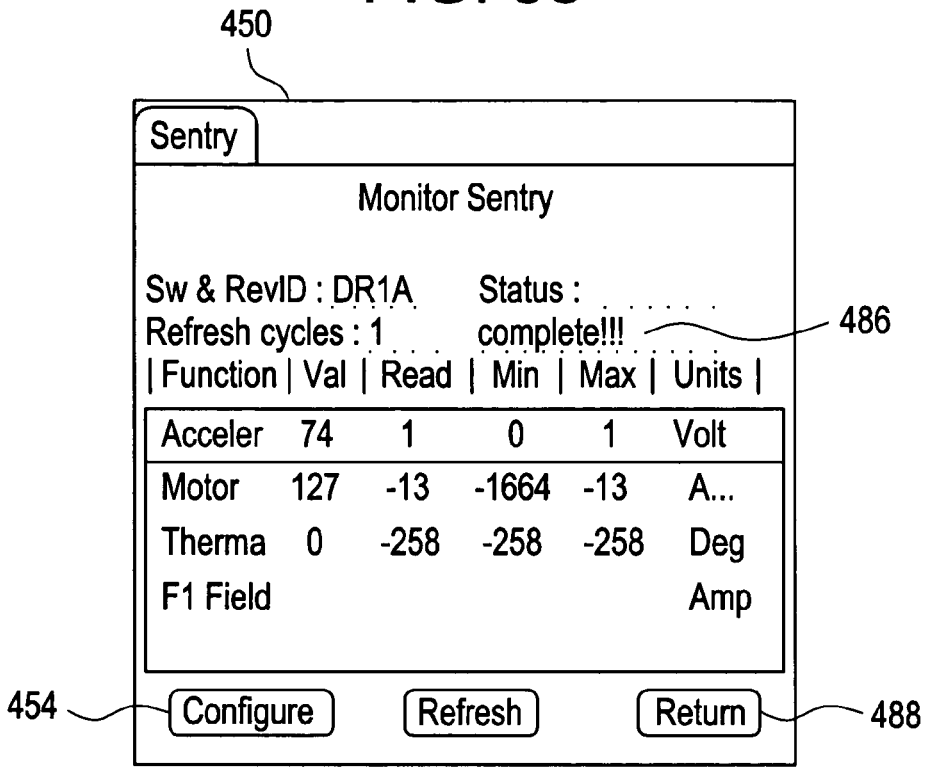
FIG. 58 shows a screen shot of an exemplary monitor sentry screen listing monitored data when complete; and, FIG. 59 shows a screen shot of an exemplary monitor sentry screen overlaid with an exemplary message to the user.

The user may click on the "OK" button 482 at the key switch prompt message screen 480, and then data may fill the field 452 of the screen 450 as shown in FIG. 57. While the data is being transferred, the word Refreshing 484 may be displayed as shown in FIG. 57, and when the refreshing cycles have stopped, the word "complete" 486 may be displayed as shown in FIG. 58. The user may be able to detect a rapid flashing of the data as it is updated during control operation. While the display is "Refreshing", all other input commands may be locked out, so that the user may not stop the data transfer or change screens during the "Refreshing" cycles.

Figure 59:
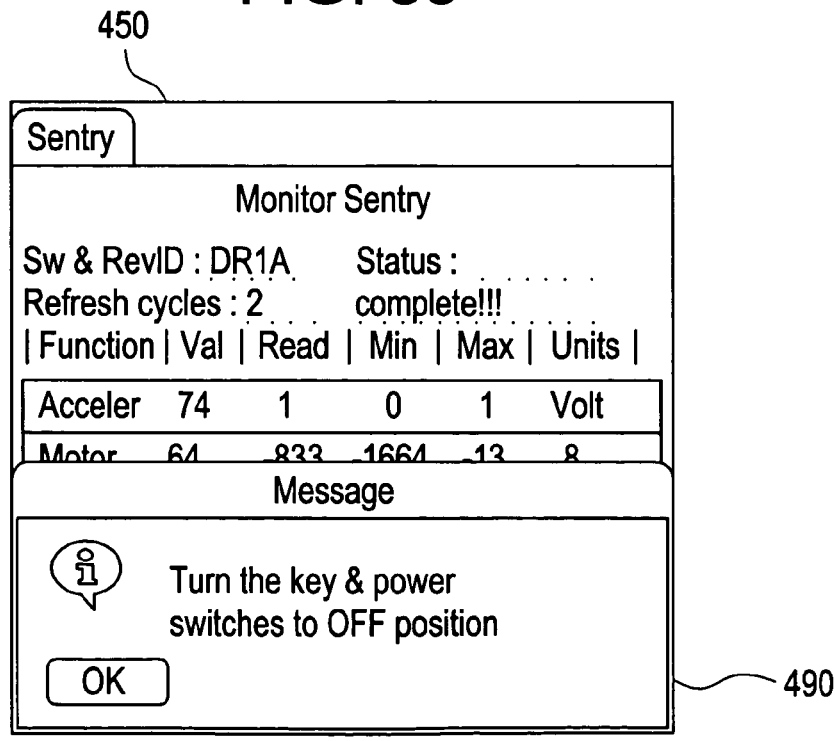

After the Refresh cycles display "complete" 486, the user may exit Sentry mode by selecting the Return button 488. As shown in FIG. 59, the message screen 490 may then prompt the user to turn off the switches for the vehicle 14.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention of claimed is:

1. A method for communicating with an EEPROM in a control of a vehicle, the method comprising:
    setting up a handheld device in communication with the control;
    starting a program within the handheld device for communicating with the EEPROM;
    logging in to the control;
    selecting an option for communicating between the handheld device and the EEPROM, the option chosen from a group of options including reading EEPROM settings, writing EEPROM settings, retrieving fault data, and a sentry monitoring mode;
    selecting reading EEPROM settings as the option, and selecting a road button for bulk downloading and displaying all EEPROM settings for a selected part, including displaying a data file of function numbers, names, and values for the selected part; and
    choosing between selecting an additional option from the group or logging off from the control.

2. The method of claim 1 further comprising, prior to selecting an option:
    entering a password;
    wherein, if the password is not valid, receiving an error message and re-entering the password, and wherein if the password is valid, selecting an option.

3. The method of claim 1 comprising selecting reading EEPROM settings as the option, and selecting a single function number for reading a corresponding function value.

4. The method of claim 1 comprising selecting writing EEPROM settings as the option, selecting a single function number, entering a new function value, and sending the new function value.

5. The method of claim 1 comprising selecting retrieving fault data as the option, and selecting a read button for retrieving the fault data.

6. The method of claim 5 further comprising selecting a reset button to clear stored fault codes.

7. The method of claim 1 comprising selecting the sentry monitoring mode as the option, and selecting vehicle parts from a main list of vehicle parts to monitor.

8. The method of claim 7 further comprising entering a time period for refreshing monitored data.

9. The method of claim 8 further comprising selecting a start button to begin monitoring data of the selected vehicle parts.

10. The method of claim 1 wherein the group of options further includes an option for rewriting software in a flash memory of the control, the method comprising selecting the rewriting software in a flash memory of the control option.

11. The method of claim 10 comprising selecting a flash application for loading into the control and selecting a start button for completing flash download.

12. The method of claim 11 further comprising receiving an error message when the selected application is not compatible with the control.

13. A system for communicating with a control, the system comprising:
    a handheld device;
    a control separate from the handheld device, the control including an EEPROM;
    a communications link between the handheld device and the control;
    wherein the handheld device is loaded with software for reading and updating settings stored in the EEPROM; and
    a storage medium within the handheld device, the storage medium encoded with machine-readable computer program code for communicating with the EEPROM, the storage medium including instructions for causing a computer within the handheld device to implement a method comprising;
    providing options for communicating between the handheld device and the EEPROM, the options including reading EEPROM settings, writing EEPROM settings, retrieving fault data, and sentry monitoring;
    wherein in response to the reading EEPROM settings option being selected, bulk downloading and displaying EEPROM settings for a selected part, including displaying a data file of function numbers, names, and values for the selected part.

14. The system of claim 13 wherein the control is housed in an electric vehicle.

15. The system of claim 13 wherein the communications link includes an RS-232 connector and a control adapter.

16. The system of claim 13 wherein the communications link is wireless.

17. A storage medium with machine-readable computer program code for communicating with an EEPROM in a control of a vehicle, the storage medium including instructions for causing a computer to implement a method comprising:
    providing an install tool for installing the computer program code onto a handheld device housing the computer;
    displaying a main menu, the main menu listing options for communicating between the computer and the EEPROM, the options including EEPROM settings, fault and sentry, and flash download; and
    if the EEPROM settings option is selected, displaying a screen containing options for bulk download or readwrite function, wherein the bulk download option provides a bulk download screen containing a data file of function numbers, names, and values for a selected part and wherein the readwrite function option provides a readwrite function screen providing the function value for a selected function name.

18. The storage medium of claim 17 wherein an updated function value for a selected function number is receivable in an entry location of the bulk download screen and the readwrite function screen for changing the function value of the function number in the data file.

19. The storage medium of claim 17 wherein, if the fault and sentry option is selected, the method further comprises a fault mode displaying a screen listing fault codes stored in the control and provides a reset button for clearing the stored fault codes from the control.

20. The storage medium of claim 17 wherein, if the fault and sentry option is selected, the method further comprises a sentry mode displaying a screen for configuring a selected list of vehicle parts for monitoring.

21. The storage medium of claim 20 wherein the method further comprises displaying a monitor sentry screen listing data related to the selected list of vehicle pads.

22. The storage medium of claim 21 wherein the method further comprises updating the data related to the selected list of vehicle parts for every refresh cycle.

23. The storage medium of claim 17 wherein, if the flash download option is selected, the method further comprises determining if the control contains a flash-compatible microprocessor.

24. The storage medium of claim 17 wherein, if the flash download option is selected, the method further comprises providing a list of flash applications and flash downloading a selected flash application to the control if the software ID of the control matches the software ID of the selected flash application.

25. A method for communicating with an EEPROM in a control of a vehicle, the method comprising:
providing an install tool for installing computer program code onto a handheld device housing a computer;
displaying a main menu, the main menu listing options for communicating between the computer and the EEPROM, the options including EEPROM settings, fault and sentry, and flash download; and
if the EEPROM settings option is selected, displaying a screen containing options for bulk download or readwrite function, wherein the bulk download option provides a bulk download screen containing a data file of function numbers, names, and values for a selected part and wherein the readwrite function option provides a readwrite function screen providing the function value for a selected function name.

26. The method of claim 25 wherein an updated function value for a selected function number is receivable in an entry location of the bulk download screen and the readwrite function screen for changing the function value of die function number in the data file.

27. The method of claim 25 further comprising, if the fault and sentry option is selected, a fault mode displaying a screen listing fault codes stored in the control and providing a reset button for clearing the stored fault codes from the control.

28. The method of claim 25 further comprising, if the fault and sentry option is selected, a sentry mode displaying a screen for configuring a selected list of vehicle parts for monitoring.

29. The method of claim 28 further comprising displaying a monitor sentry screen listing data related to the selected list of vehicle parts.

30. The method of claim 29 further comprising updating the data related to die selected list of vehicle parts for every refresh cycle.

31. The method of claim 25 further comprising, if the flash download option is selected, determining if the control contains a flash-compatible microprocessor.

32. The method of claim 25 further comprising, if the flash download option is selected, providing a list of flash applications and flash downloading a selected flash application to the control if the software ID of the control matches the software ID of the selected flash application.

* * * * *